(12) United States Patent
Incera Garrido et al.

(10) Patent No.: US 10,486,086 B2
(45) Date of Patent: Nov. 26, 2019

(54) PROCESS FOR REDUCING THE VOLUME FLOW COMPRISING MAGNETIC AGGLOMERATES BY ELUTRIATION

(71) Applicant: BASF SE, Ludwigshafen (DE)

(72) Inventors: Gerardo Incera Garrido, Kassel (DE); Michael Mentges, Frankfurt (DE)

(73) Assignee: BASF SE, Ludwigshafen am Rhein (DE)

( * ) Notice: Subject to any disclaimer, the term of this patent is extended or adjusted under 35 U.S.C. 154(b) by 381 days.

(21) Appl. No.: 15/108,846

(22) PCT Filed: Jan. 8, 2015

(86) PCT No.: PCT/EP2015/050244
§ 371 (c)(1),
(2) Date: Jun. 29, 2016

(87) PCT Pub. No.: WO2015/104324
PCT Pub. Date: Jul. 16, 2015

(65) Prior Publication Data
US 2016/0317951 A1    Nov. 3, 2016

(30) Foreign Application Priority Data
Jan. 8, 2014   (EP) ..................... 14150406

(51) Int. Cl.
*B01D 21/00*   (2006.01)
*B03C 1/01*   (2006.01)
(52) U.S. Cl.
CPC ........... *B01D 21/0009* (2013.01); *B03C 1/01* (2013.01); *B03C 2201/18* (2013.01)

(58) Field of Classification Search
CPC .... B03C 1/01; B03C 2201/18; B01D 21/0009
USPC ........................................ 210/695; 209/8, 39
See application file for complete search history.

(56) References Cited

U.S. PATENT DOCUMENTS

| | | | |
|---|---|---|---|
| 4,657,666 | A | 4/1987 | Snook et al. |
| 4,834,898 | A | 5/1989 | Hwang |
| 5,051,199 | A | 9/1991 | Barwise |
| 5,161,694 | A | 11/1992 | Yoon et al. |
| 8,318,025 | B2 | 11/2012 | Domke et al. |
| 8,646,613 | B2 | 2/2014 | Reiger et al. |
| 2011/0127201 | A1 | 6/2011 | Domke et al. |

FOREIGN PATENT DOCUMENTS

| | | |
|---|---|---|
| CA | 2832814 A1 | 10/2012 |
| CN | 101618366 A | 1/2010 |
| EP | 1200408 A2 | 5/2002 |
| WO | WO-0109099 A2 | 2/2001 |
| WO | WO-02/0066168 A1 | 8/2002 |
| WO | WO-2007008322 A1 | 1/2007 |

(Continued)

OTHER PUBLICATIONS

Chinese Office Action with English Translation for Chinese Application No. 201580003551.6, dated May 24, 2017.

(Continued)

*Primary Examiner* — Claire A Norris
(74) *Attorney, Agent, or Firm* — Drinker Biddle & Reath LLP

(57) ABSTRACT

The present invention relates to a process for the separation of at least one first material from a mixture comprising this at least one first material and at least one second material.

12 Claims, 2 Drawing Sheets

(56) References Cited

FOREIGN PATENT DOCUMENTS

| WO | WO-2009030669 A2 | 3/2009 |
|----|------------------|--------|
| WO | WO-2011/058033 A1 | 5/2011 |
| WO | WO-2011064757 A1 | 6/2011 |
| WO | WO-2012051424 A2 | 4/2012 |
| WO | WO-2012/104292 A1 | 8/2012 |
| WO | WO-2012/140065 A1 | 10/2012 |
| WO | WO-2013/038192 A1 | 3/2013 |
| WO | WO-2013167634 A1 | 11/2013 |

OTHER PUBLICATIONS

International Search Report for PCT/EP2015/050244 dated Apr. 23, 2015.
Bulatovic, S. M., "Handbook of Flotation Reagents: Chemistry, Theory and Practice", 2007, vol. 1, pp. 1-41.
Gray, S. R., "Recovery of Fine Gold Particles by Flocculation with Hydrophobic Magnetite", Fifth AusIMM Extractive Metallurgy Conference, 1991, pp. 223-226.
Körber, R., "Elutriation", Ullmann's Encyclopedia of Industrial Chemistry, 2012, vol. 12, pp. 443-455.

PROCESS FOR REDUCING THE VOLUME FLOW COMPRISING MAGNETIC AGGLOMERATES BY ELUTRIATION

CROSS-REFERENCE TO RELATED APPLICATIONS

This application is a national stage application (under 35 U.S.C. § 371) of PCT/EP2015/050244, filed Jan. 8, 2015, which claims benefit of European Application No. 14150406.8, filed Jan. 8, 2014, both of which are incorporated herein by reference in their entirety.

The present invention relates to a process for the separation of at least one first material from a mixture comprising this at least one first material and at least one second material at least comprising the following steps (A) contacting of the mixture comprising at least one first material and at least one second material with at least one magnetic particle optionally in the presence of at least dispersion medium so that the at least one first material and the at least one magnetic particle agglomerate to obtain a mixture or dispersion comprising magnetic agglomerates of the at least one first material and the at least one magnetic particle, and the at least one second material, (B) optionally addition of at least dispersion medium to the mixture or dispersion of step (A), (C) separation of at least part of the at least one second material due to its different settling velocity under gravitation compared to the magnetic agglomerates of the at least one first material and at least one magnetic particle, from the dispersion of step (A) or (B), to obtain a dispersion comprising a lower amount of the at least one second material, and (D) separation of the magnetic agglomerates from the dispersion of step (C) by application of a magnetic field.

In particular, the present invention relates to a process for the enrichment of ores in the presence of the gangue.

Processes for separating ores from mixtures comprising these are already known from the prior art.

WO 02/0066168 A1 relates to a process for separating ores from mixtures comprising these, in which suspensions or slurries of these mixtures are treated with particles which are magnetic and/or capable of floating in aqueous solutions. After addition of the magnetic particles and/or particles capable of floating, a magnetic field is applied so that the agglomerates are separated off from the mixture. However, the extent to which the magnetic particles are bound to the ore and the strength of the bond is not sufficient for the process to be carried out with a satisfactorily high yield and effectiveness.

U.S. Pat. No. 4,657,666 discloses a process for the enrichment of ores, in which the ore present in the gangue is treated with magnetic particles, as a result of which agglomerates are formed due to the hydrophobic interactions. The magnetic particles are hydrophobized on the surface by treatment with hydrophobic compounds, so that attachment to the ore occurs. The agglomerates are then separated off from the mixture by means of a magnetic field. The cited document also discloses that the ores are treated with a surface-activating solution of 1% sodium ethylxanthogenate before the magnetic particle is added. In this process, separation of ore and magnetic particle is effected by the destruction of the surface-activating substance which has been applied in the form of the surface-activating solution to the ore. Furthermore, in this process only $C_4$-hydrophobising agents are used for the ore.

U.S. Pat. No. 4,834,898 discloses a process for separating off nonmagnetic materials by bringing them into contact with magnetic reagents which are enveloped by two layers of surface-modifying substances. U.S. Pat. No. 4,834,898 also discloses that the surface charge of the nonmagnetic particles which are to be separated off can be influenced by various types and concentrations of electrolytes reagents. For example, the surface charge is altered by addition of multivalent anions, for example tripolyphosphate ions.

S. R. Gray, D. Landberg, N. B. Gray, Extractive Metallurgy Conference, Perth, 2-4 Oct. 1991, pages 223-226, disclose a process for recovering small gold particles by bringing the particles into contact with magnetite. Before contacting, the gold particles are treated with potassium amylxanthogenate. A process for separating the gold particles from at least one hydrophilic material is not disclosed in this document.

WO 2007/008322 A1 discloses a magnetic particle which is hydrophobized on the surface for separating impurities from mineral substances by magnetic separation processes. According to WO 2007/008322 A1, a dispersant selected from among sodium silicate, sodium polyacrylate and sodium hexametaphosphate can be added to the solution or dispersion.

WO2009/030669 A1 discloses a process for separating at least one first material from a mixture comprising this at least one first material and at least one second material, in which the first material is firstly brought into contact with a surface-modifying substance to hydrophobize it, this mixture is then brought into contact with at least one magnetic particle so that the magnetic particle and the hydrophobized first material become attached to one another and this agglomerate is separated from the at least one second material by application of a magnetic field. The at least one first material is subsequently separated, preferably quantitatively, from the magnetic particle, with the magnetic particle preferably being able to be recirculated to the process. This document does not disclose that the addition of magnetic particles prior to a surface-modifying substance or the addition of magnetic particles and a surface-modifying substance at the same time gives rise to certain advantages like accelerated agglomeration.

Further WO 2012/051424 A2 discloses a method to process ilmenite-containing mineral material with high clay content including processing involving settling velocity separation to prepare a first ilmenite concentrate followed by processing involving magnetic separation to prepare a second ilmenite concentrate.

The method of elutriation is mentioned for example in R. Körber, Ullmann's Encyclopedia of Industrial Chemistry, 2012, Wiley-UCH Verlag, Weinheim, pages 443 to 455.

Figure 1:
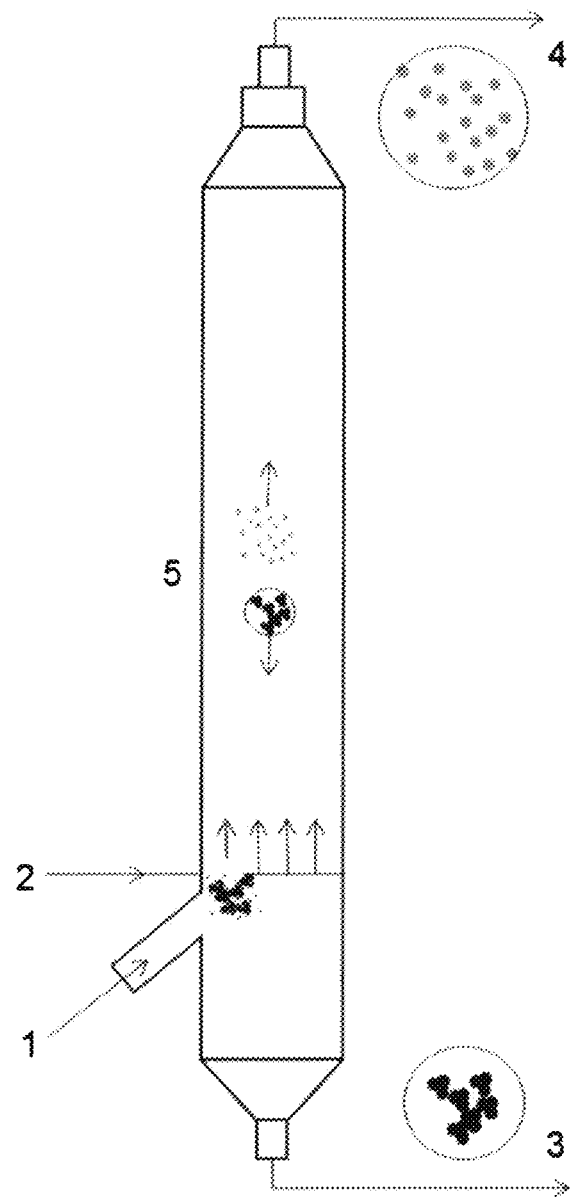
FIG. 1 shows an exemplary column for step (C) of the process according to the present invention.

It is an object of the present invention to provide a process by means of which at least one first material can be efficiently separated from mixtures comprising at least one first material and at least one second material by application of a magnetic field onto a dispersion comprising magnetic agglomerates containing the desired at least one first material, wherein the amount of dispersion to be treated magnetically shall be as low as possible, in order to increase the separation- and therewith cost-efficiency, in particular of the step of magnetic separation. A further object of the present invention is to treat the first particles to be separated off in such a way that the addition product of magnetic particle and first material is sufficiently stable to ensure a high yield of the first material in the separation.

These objects are achieved by a process for the separation of at least one first material from a mixture comprising this at least one first material and at least one second material at least comprising the following steps:

(A) Contacting of the mixture comprising at least one first material and at least one second material with at least one magnetic particle optionally in the presence of at least dispersion medium so that the at least one first material and the at least one magnetic particle agglomerate to obtain a mixture or dispersion comprising magnetic agglomerates of the at least one first material and the at least one magnetic particle, and the at least one second material, (B) optionally addition of at least one dispersion medium to the mixture or dispersion of step (A), (C) Separation of at least part of the at least one second material due to its different settling velocity under gravitation compared to the magnetic agglomerates of the at least one first material and at least one magnetic particle, from the dispersion of step (A) or (B), to obtain a dispersion comprising a lower amount of the at least one second material, (D) Separation of the magnetic agglomerates from the dispersion of step (C) by application of a magnetic field.

The process of the invention is preferably employed for separating at least one first, hydrophobic material from a mixture comprising this at least one first, hydrophobic material and at least one second, hydrophilic material.

For the purposes of the present invention, "hydrophobic" means that the corresponding particle can subsequently be hydrophobized by treatment with the at least one surface-modifying substance.

It is also possible for a particle which is hydrophobic per se to be additionally hydrophobized by treatment with the at least one surface-modifying substance.

Within the scope of the present invention, "hydrophobic" means that the surface of corresponding "hydrophobic substances", and, respectively, of a "hydrophobized substance" has a contact angle with water against air of >90°. In the scope of the present invention, "hydrophilic" means that the surface of corresponding "hydrophilic substance" has a contact angle with water against air of <90.

Methods to determine the contact angle are well known to the skilled artisan. For example, for the determination of the contact angel against water may be determined by optical drop shape analysis, e.g. using a DSA 100 contact angle measuring device of Krüsse (Hamburg, Germany) with the respective software. Typically 5 to 10 independent measurements are performed in order to determine a reliable average contact angle.

In a preferred embodiment of the process of the invention, the at least one first material is at least one hydrophobic metal compound.

In a preferred embodiment of the process of the invention, the at least one first material is at least one hydrophobic metal compound or coal and the at least one second material is preferably at least one hydrophilic metal compound.

Therefore, in a preferred embodiment, the present invention relates to a process for the separation of at least one first material from a mixture comprising this at least one first material and at least one second material at least comprising the following steps:

(A) Contacting of the mixture comprising at least one first material and at least one second material with at least one magnetic particle optionally in the presence of at least dispersion medium so that the at least one first material and the at least one magnetic particle agglomerate to obtain a mixture or dispersion comprising magnetic agglomerates of the at least one first material and the at least one magnetic particle, and the at least one second material, (B) optionally addition of at least one dispersion medium to the mixture or dispersion of step (A), (C) Separation of at least part of the at least one second material due to its different settling velocity under gravitation compared to the magnetic agglomerates of the at least one first material and at least one magnetic particle, from the dispersion of step (A) or (B), to obtain a dispersion comprising a lower amount of the at least one second material, (D) Separation of the magnetic agglomerates from the dispersion of step (C) by application of a magnetic field; wherein the at least one first material is at least one hydrophobic metal compound.

In another preferred embodiment of the process of the invention, the at least one first material is at least one hydrophobic metal compound and the at least one second material is at least one hydrophilic metal compound.

In a further preferred embodiment of the process according to the present invention, the at least one hydrophobic metal compound is selected from the group consisting of sulfidic ores, oxidic ores, carbonate-comprising ores, noble metals in elemental form, compounds comprising noble metals and mixtures thereof.

The present invention therefore preferably relates to the process according to the present invention, wherein the at least one hydrophobic metal compound is selected from the group consisting of sulfidic ores, oxidic ores, carbonate-comprising ores, noble metals in elemental form, compounds comprising noble metals and mixtures thereof.

In a further preferred embodiment of the process according to the present invention, the at least one hydrophilic metal compound is selected from the group consisting of oxidic metal compounds, hydroxidic metal compounds and mixtures thereof.

The present invention therefore preferably relates to the process according to the present invention, wherein the at least one hydrophilic metal compound is selected from the group consisting of oxidic metal compounds, hydroxidic metal compounds and mixtures thereof.

Examples of the at least one first material to be separated off are preferably metal compounds selected from the group consisting of sufidic ores, oxidic and/or carbonate-comprising ores, for example azurite $[Cu_3(CO_3)_2(OH)_2]$ or malachite $[Cu_2[(OH)_2|CO_3]]$, rare earth metals comprising ores like bastnaesite $(Y, Ce, La)CO_3F$, monazite $(RE)PO_4$ (RE=rare earth metal); or chrysocolla $(Cu,Al)_2H_2Si_2O_5(OH)_4$ or hydrates thereof, noble metals in elemental form and their compounds to which a surface-modifying compound can become selectively attached to produce hydrophobic surface properties; or any mixtures of the foregoing. Examples of noble metals that may be present as at least first material are Au, Pt, Pd, Rh, etc., preferably in the native state or as sulphides, phosphides, selenides, tellurides or as alloys with bismuth, antimony and/or other metals.

Examples of sulfidic ores which can be separated according to the invention are, for example, selected from the group of copper ores consisting of covellite CuS, molybdenum(IV) sulfide, chalcopyrite (cupriferous pyrite) $CuFeS_2$, bornite $Cu_5FeS_4$, chalcocite (copper glass) $Cu_2S$, pendlandite $(Fe,Ni)_9S_8$, and mixtures thereof.

In a preferred embodiment, the sulfidic ore as the at least one hydrophobic metal compound of the at least one first material is selected from the group consisting of covellite (CuS), chalcopyrite ($CuFeS_2$), bornite ($Cu_5FeS_4$), chalcocite ($Cu_2S$), pentlandite $(Fe, Ni)_9S_8$, FeS, $FeS_2$, PbS, ZnS and mixtures thereof.

Suitable oxidic metal compounds which may be present as at least one second material according to the invention are preferably selected from the group consisting of silicon dioxide $SiO_2$, silicates, aluminosilicates, for example feldspars, for example albite $Na(Si_3Al)O_8$, mica, for example muscovite $KAl_2[(OH,F)_2AlSi_3O_{10}]$, garnets $(Mg, Ca, Fe^{II})_3$ $(Al, Fe^{III})_2(SiO_4)_3$ and further related minerals and mixtures thereof.

Accordingly, untreated ore mixtures obtained from mines are preferably used as Mixture comprising at least one first material and at least one second material in the process of the invention.

In a preferred embodiment of the process of the invention, the mixture comprising at least one first material and at least one second material in step (A) is in the form of particles having a size of from 100 nm to 400 μm, see for example U.S. Pat. No. 5,051,199. In a preferred embodiment, this particle size is obtained by milling. Suitable processes and apparatuses are known to those skilled in the art, for example wet milling in a ball mill. The mixture comprising at least one first material and at least one second material is therefore milled to particles having a size of from 100 nm to 400 μm before or during step (A) in a preferred embodiment of the process of the invention. Preferred ore mixtures have a content of sulfidic minerals of at least 0.4% by weight, particularly preferably at least 10% by weight.

According to the present invention, the at least one first material has preferably a particle size of less than 200 μm, for example 2 to 200 μm, preferably 10 to 100 μm, wherein the d80 value is mentioned in each case. According to the present invention, all particle sizes that are mentioned are acquired according to Malvern, wherein the Mastersizer measurement is based on the ISO 13320:2009 standard.

Therefore, according to a preferred embodiment, the mixture to be treated according to the present invention is milled before step (A) into to obtain the at least one first material in the preferred particle size as mentioned above.

Examples of sulfidic minerals which are present in the mixtures which can be used according to the invention are those mentioned above. In addition, sulfide of metals other than copper, for example, sulfides of iron, lead, zinc or molybdenum, i.e. FeS, $FeS_2$, PbS, ZnS or $MoS_2$, can also be present in the mixtures. Furthermore, oxidic compounds of metals and semimetals, for example silicates or borates or other salts of metals and semimetals, for example phosphates, sulfates or oxides/hydroxides/carbonates, and further salts, for example azurite $[Cu_3(CO_3)_2(OH)_2]$, malachite $[Cu_2[(OH)_2(CO_3)]]$, barite ($BaSO_4$), monazite $((La-Lu)PO_4)$, spinels $(Mg, Ca, Fe(II))(Fe(III), Al, Cr)_2O_4$, can be present in the ore mixtures to be treated according to the present invention.

A typical ore mixture which can be separated by means of the process of the invention has the following composition: about 30% by weight of $SiO_2$ as an example of a preferred at least one second material, about 30% by weight of feldspar (e.g. $Na(Si_3Al)O_8$), about 3% by weight of $CuFeS_2$ as an example of a preferred at least one first material, about 0.05% by weight of $MoS_2$, balance chromium, iron, titanium and magnesium oxides.

The individual steps of the process of the invention are described in detail below:

Step (A):

Step (A) of the process according to the present invention comprises the contacting of the mixture comprising at least one first material and at least one second material with at least one magnetic particle optionally in the presence of at least dispersion medium so that the at least one first material and the at least one magnetic particle agglomerate to obtain a mixture or dispersion comprising magnetic agglomerates of the at least one first material and the at least one magnetic particle, and the at least one second material.

Suitable and preferred first and second materials have been mentioned above.

As magnetic particles, it is generally possible to use all magnetic particles known to those skilled in the art which satisfy the requirements of the process of the invention, for example suspendability in any suspension medium used and the ability to be functionalized by the at least one polymeric compound.

Furthermore, the magnetic particle should have a sufficiently high saturation magnetizability, for example 25-300 emu/g, and a low remanence so that the adduct can be separated off in a sufficient amount from the suspension in step (C) of the process of the invention.

In a preferred embodiment, the at least one magnetic particle is selected from the group consisting of magnetic metals, for example iron, iron silicon alloys (FeSi-alloys), cobalt, nickel and mixtures thereof, ferromagnetic alloys of magnetic metals, magnetic iron oxides, for example magnetite, maghemite, cubic ferrites of the general formula (II)

$$M^{2+}_xFe^{2+}_{1-x}Fe^{3+}_2O_4 \qquad (II)$$

where
M is selected from among Co, Ni, Mn, Zn and mixtures thereof and
$x \leq 1$,
hexagonal ferrites, for example barium or strontium ferrite $MFe_{12}O_{19}$ where M=Ca, Sr, Ba, and mixtures thereof.

In a particularly preferred embodiment of the present patent application, the at least one magnetic particle is magnetite $Fe_3O_4$ or cobalt ferrite  $Co^{2+}_xFe^{2+}_{1-x}Fe^{3+}_2O_4$ where $x \leq 1$, for example $Co_{0.25}Fe_{2.75}O_4$.

In a particularly preferred embodiment, the at least one magnetic particle is magnetite. Magnetite is known to the skilled artisan and is commercially available, e.g. as magnetic pigment 345 (BASF SE) or magnetite from Höganäs. Furthermore, processes for the preparation of magnetite are known to those skilled in the art.

The size of the magnetic particles used according to the invention is preferably from 10 nm to 100 μm. Particularly preferably, the magnetic particles have a size of 1 μm to 45 μm, more preferred 4 μm to 30 μm, d80 value in each case. The wording "d80" is known the skilled artisan and means that 80% by weight of the corresponding particles have a diameter that is smaller than the mentioned value. Methods for analyzing the diameter of the magnetic particles or other particles that are used or treated according to the present invention are known to the skilled artisan. Such methods for example include Laser Diffraction Measurement, in particular Laser Diffraction Measurement using a Mastersizer 2000 with software version 5.12G, wherein the sample is dispersed in an aqueous solution of $Na_4P_2O_7$.

According to a preferred embodiment of the present invention, the particle size of the at least one first material as mentioned above and the magnetic particles are selected in a way that the ratio of particle size of the at least one first material to the at least one magnetic particle is at most 7, preferably at most 6, d80 values in each case.

Therefore, the present invention preferably relates to the process according to the present invention, wherein the ratio of particle size of the at least one first material to the at least one magnetic particle is at most 7.

According to a preferred embodiment of the present invention, the particle size of the at least one first material as mentioned above and the magnetic particles are selected in a way that the ratio of particle size of the at least one first material to the at least one magnetic particle is at most 7:1, preferably at most 6:1, d80 values in each case.

Therefore, the present invention preferably relates to the process according to the present invention, wherein the ratio of particle size of the at least one first material to the at least one magnetic particle is at most 7:1.

In another preferred embodiment, the ratio of particle size as determined by the d80 of the at least one first material and the at least one magnetic particle is from about 1:1 to about 7:1, preferably from about 2:1 to about 7:1 and more preferably from about 5:1 to about 7:1.

The magnetic particles which can be used according to the invention can optionally be hydrophobicized on the surface, for example by means of at least one hydrophobic compound selected from among compounds of the general formula (V)

B—Y' (V), where

B is selected from among linear or branched $C_1$-$C_{30}$-alkyl, $C_1$-$C_{30}$-heteroalkyl, optionally substituted $C_6$-$C_{30}$-aryl, optionally substituted $C_6$-$C_{30}$-heteroalkyl, $C_6$-$C_{30}$-aralkyl and Y' is a group by means of which the compound of the general formula (V) binds to the at least one magnetic particle.

In a particularly preferred embodiment, B is a linear or branched $C_6$-$C_{18}$-alkyl, preferably linear $C_8$-$C_{12}$-alkyl, very particularly preferably a linear $C_{12}$-alkyl. Heteroatoms which may be present according to the invention are selected from among N, O, P, S and halogens such as F, Cl, Br and I.

In a further particularly preferred embodiment, Y' is selected from the group consisting of —$(X)_n$—$SiHal_3$, —$(X)_n$—$SiHHal_2$, —$(X)_n$—$SiH_2Hal$ where Hal is F, Cl, Br, I, and anionic groups such as —$(X)_n$—$SiO_3^{3-}$, —$(X)_n$—$CO_2^-$, —$(X)_n$—$PO_3^{2-}$, —$(X)_n$—$PO_2S^{2-}$, —$(X)_n$—$POS_2^{2-}$, —$(X)_n$—$PS_3^{2-}$, —$(X)_n$—$PS_2^-$, —$(X)_n$—$POS^-$, —$(X)_n$—$PO_2^-$, —$(X)_n$—$CO_2^-$, —$(X)_n$—$CS_2^-$, —$(X)_n$—$COS^-$, —$(X)_n$—$C(S)NHOH$, —$(X)_n$—$S^-$ where X=O, S, NH, $CH_2$ and n=0, 1 or 2, and, if appropriate, cations selected from the group consisting of hydrogen, $NR_4^+$ where the radicals R are each, independently of one another, hydrogen or $C_1$-$C_8$-alkyl, an alkaline earth metal or zinc, also —$(X)_n$—$Si(OZ')_3$ where n=0, 1 or 2 and Z'=charge, hydrogen or short-chain alkyl radical.

If n=2 in the formulae mentioned, two identical or different, preferably identical, groups B are bound to a group Y'.

Very particularly preferred hydrophobicizing substances of the general formula (V) are alkyltrichlorosilanes (alkyl group having 6-12 carbon atoms), alkyltrimethoxysilanes (alkyl group having 6-12 carbon atoms), octylphosphonic acid, lauric acid, oleic acid, stearic acid or mixtures thereof.

In another embodiment, the hydrophobicizing substance is a compound of the general formula (Va) or derivative thereof

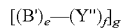 (Va), wherein each B' is independently selected from among linear or branched $C_1$-$C_{30}$-alkyl, $C_1$-$C_{30}$-heteroalkyl, optionally substituted $C_6$-$C_{30}$-aryl, optionally substituted $C_6$-$C_{30}$-heteroalkyl, $C_6$-$C_{30}$-aralkyl;

and each Y" is independently selected as a group by means of which the compound of the general formula (Va) binds to the at least one magnetic particle;

each e is the integer 1, 2, 3, 4, 5, 6, 7, 8, 9 or 10;

each f is the integer 1, 2, 3, 4, 5, 6, 7, 8, 9 or 10; and each g is the integer 1, 2, 3, 4, 5, 6, 7, 8, 9 or 10 to 100.

In a particularly preferred embodiment, B' is a linear or branched $C_6$-$C_{18}$-alkyl, preferably linear $C_8$-$C_{12}$-alkyl and very particularly preferably a linear $C_{12}$-alkyl.

In a further particularly preferred embodiment, Y" is selected from the group consisting of —$(X)_p$—$Si(R^2)_3$, —$(X)_p$—$SiH(R^2)_2$, —$(X)_p$$SiH_2R^2$, wherein each $R^2$ is independently selected from F, Cl, Br, I or OH; and anionic groups such as

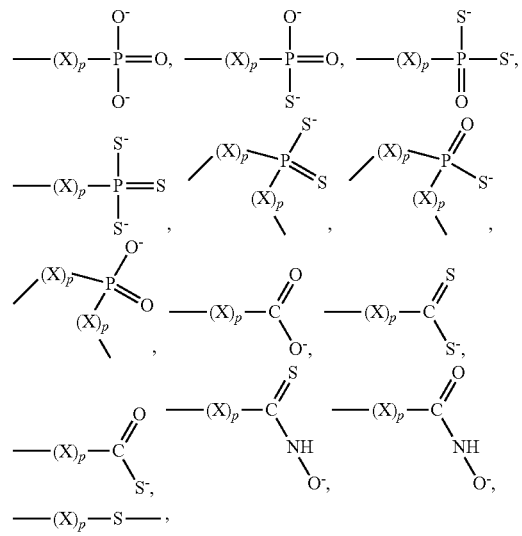

wherein each X is independently O, S, NH, or $CH_2$ and p is 0, 1 or 2.

Very particularly preferred hydrophobizing substances of the general formula (Va) are silicon-based oils or siloxanes resulting from in-situ hydrolysis of dodecyl- or other alkyltrichlorosilanes or alkyltrialkoxysilanes; phosphonic acids, for example octylphosphonic acid; carboxylic acids; for example lauric acid, oleic acid or stearic acid; partly polymerized siloxanes (also known as silicon oils), or mixtures thereof.

In a preferred embodiment, the hydrophobizing substance is a compound as disclosed in WO 2012/140065.

Further preferred hydrophobizing substances are mono-, oligo- or polysiloxanes with free OH groups, such as the compounds of formula (Vaa), (Vab) and (Vac) or derivatives thereof,

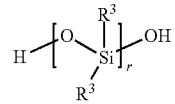 (Vaa)

-continued

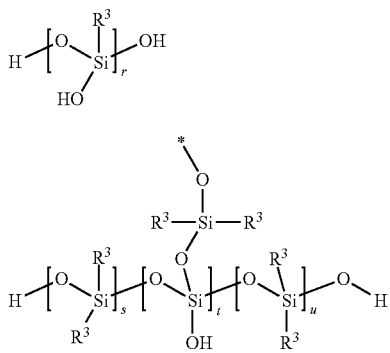

wherein each r, s, t, and u is independently an integer from 1 to 100, and each $R^3$ is independently a straight or branched $C_1$-$C_{12}$ alkyl group.

In formula (Vac),* denotes a bonding to further moieties comprising —$SiOR_4$ and wherein $R^4$ is selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_1$-$C_{20}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl.

In a preferred embodiment, the hydrophobizing substances of formula (Vaa), (Vab) or (Vac) have a molecular weight from about 250 to about 200000 g/mol, preferably from about 250 to about 20000 g/mol and particularly preferably from about 300 to about 5000 g/mol.

According to a preferred embodiment, the hydrophobizing substance is a compound of the general formulas (Vb), (Vba), (Vbb), (Vbc) or derivatives thereof

 (Vb)

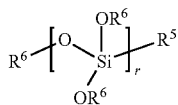 (Vba)

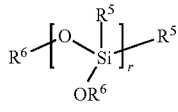 (Vbb)

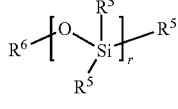 (Vbc)

wherein each $R^5$ is independently selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_1$-$C_{20}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl;

each $R^6$ is independently selected from hydrogen, linear or branched, optionally substituted $C_1$-$C_{30}$-alkyl, linear or branched, optionally substituted $C_2$-$C_{30}$-alkenyl, linear or branched, optionally substituted $C_2$-$C_{30}$-alkynyl, optionally substituted $C_3$-$C_{20}$-cycloalkyl, optionally substituted $C_3$-$C_{20}$-cycloalkenyl, optionally substituted $C_1$-$C_{20}$-heteroalkyl, optionally substituted $C_5$-$C_{22}$-aryl, optionally substituted $C_6$-$C_{23}$-alkylaryl, optionally substituted $C_6$-$C_{23}$-arylalkyl or optionally substituted $C_5$-$C_{22}$-heteroaryl, and the integer r is as described above and v is the integer 1, 2 or 3.

Preference is given to the radicals $R^5$ each being, independently of one another, linear or branched, optionally substituted $C_1$-$C_{30}$-alkyl, particularly preferably $C_1$-$C_{20}$-alkyl, very particularly preferably $C_4$-$C_{12}$-alkyl. In a preferred embodiment, $R^5$ is linear or branched, unsubstituted $C_1$-$C_{30}$-alkyl, particularly preferably $C_1$-$C_{20}$-alkyl or very particularly preferably $C_4$-$C_{12}$-alkyl. Examples of linear or branched $C_4$-$C_{12}$-alkyl radicals are butyl, in particular, n-butyl, isobutyl, tert-butyl; pentyl, in particular n-pentyl, isopentyl, tert-pentyl; hexyl, in particular n-hexyl, isohexyl, tert-hexyl, heptyl; in particular n-heptyl, isoheptyl, tert-heptyl; octyl in particular n-octyl, isooctyl, tert-octyl; nonyl, in particular n-nonyl, isononyl, tert-nonyl, decyl, in particular n-decyl, isodecyl, tert-decyl, undecyl, in particular n-undecyl, isoundecyl, tert-undecyl, or dodecyl, in particular n-dodecyl; isododecyl or tert-dodecyl.

Further preference is given to the radicals $R^5$ each being, independently of one another, linear or branched, optionally substituted $C_2$-$C_{30}$-alkenyl, particularly preferably $C_2$-$C_{20}$-alkenyl, very particularly preferably or $C_2$-$C_{12}$-alkenyl. Examples of alkenyl radicals which are particularly preferred according to the invention are ethenyl (vinyl), propenyl, in particular n-propenyl, isopropenyl, butenyl, in particular n-butenyl, isobutenyl, tert-butenyl, pentenyl, in particular n-pentenyl, isopentenyl, tert-pentenyl, hexenyl, in particular n-hexenyl, isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl and tert-dodecenyl.

Further preference is given to the radicals $R^5$ each being, independently of one another, linear or branched, optionally substituted $C_2$-$C_{30}$-alkynyl, particularly preferably $C_2$-$C_{20}$-alkynyl, very particularly preferably $C_2$-$C_{12}$-alkynyl. Examples of alkynyl radicals which are particularly preferred according to the invention are ethynyl, propynyl, in particular n-propynyl, isopropynyl, butynyl, in particular n-butynyl, isobutynyl, tert-butynyl, pentynyl, in particular n-pentynyl, isopentynyl, tert-pentynyl, hexynyl, in particular n-hexynyl, isohexynyl, tert-hexynyl, heptynyl, in particular n-heptynyl, isoheptynyl, tert-heptynyl, octynyl, in particular n-octynyl, isooctynyl, tert-octynyl, nonynyl, in particular n-nonynyl, isononynyl, tert-nonynyl, decynyl, in particular n-decynyl, isodecynyl, tert-decynyl, undecynyl, in particular n-undecynyl, isoundecynyl, tert-undecynyl, or dodecynyl, in particular n-dodecynyl, isododecynyl and tert-dodecynyl.

Further preference is given to the radicals $R^5$ each being, independently of one another, optionally substituted $C_3$-$C_{20}$-cycloalkyl, particularly preferably $C_3$-$C_{12}$-cycloalkyl, very particularly preferably $C_3$-$C_6$-cycloalkyl, such as cyclopropyl, cyclobutyl, cyclopentyl or cyclohexyl.

Further preference is given to the radicals $R^5$ each being, independently of one another, optionally substituted $C_3$-$C_{20}$- cycloalkenyl, particularly preferably $C_3$-$C_{12}$-cycloalkenyl, very particularly preferably $C_3$-$C_6$-cycloalkenyl such as cyclopropenyl, cyclobutenyl, cyclopentenyl or cyclohexenyl.

Further preference is given to the radicals $R^5$ each being, independently of one another, optionally substituted $C_1$-$C_{20}$-heteroalkyl, particularly preferably $C_1$-$C_{12}$-heteroalkyl. The heteroalkyl radicals present according to the invention are derived from the abovementioned alkyl radicals, with at least one carbon atom being replaced by a heteroatom selected from among N, O, P and S.

Further preference is given to the radicals $R^5$ each being, independently of one another, optionally substituted $C_5$-$C_{22}$-aryl, particularly preferably $C_5$-$C_{12}$-aryl. Examples of aryl radicals which are preferred according to the invention are phenyl, naphthyl or biaryls.

Further preference is given to the radicals $R^5$ each being, independently of one another, optionally substituted $C_6$-$C_{23}$-alkylaryl, particularly preferably $C_6$-$C_{13}$-alkylaryl. An example of an alkylaryl radical which is preferred according to the invention is benzyl.

Further preference is given to the radicals $R^5$ each being, independently of one another, optionally substituted $C_6$-$C_{23}$-arylalkyl, particularly preferably $C_6$-$C_{13}$-arylalkyl. Examples of arylalkyl radicals which are preferred according to the invention are tolyl, xylyl, propylbenzyl or hexylbenzyl.

Further preference is given to the radicals $R^5$ each being, independently of one another, optionally substituted $C_5$-$C_{22}$-heteroaryl, particularly preferably $C_5$-$C_{12}$-heteroaryl.

The abovementioned radicals $R^5$ can optionally be substituted. Suitable substituents are, for example, selected from among amino, amido, imido, hydroxyl, ether, aldehyde, keto, carboxylic acid, thiol, thioether, hydroxamate and carbamate groups. The abovementioned radicals $R^5$ can be mono- or poly-substituted. In the case of multiple substitutions, one substituent group can be present a plurality of times or various functional groups are simultaneously present. The radicals mentioned for $R^5$ can also be monosubstituted or polysubstituted by the abovementioned alkyl, alkenyl, alkynyl, aryl, alkylaryl, arylalkyl, heteroalkyl or heteroaryl radicals.

Very particularly preferred radicals $R^6$ are octyl, in particular n-octyl; hexyl, in particular n-hexyl; and/or butyl, in particular n-butyl; decyl, in particular n-decyl; or dodecyl, in particular n-dodecyl.

Preference is given to the radicals $R^6$ each being, independently of one another, hydrogen, linear or branched, optionally substituted $C_1$-$C_{30}$-alkyl, particularly preferably $C_1$-$C_{20}$-alkyl, very particularly preferably $C_1$-$C_{12}$-alkyl. In a preferred embodiment, $R^6$ is linear or branched, unsubstituted $C_1$-$C_{30}$-alkyl, particularly preferably $C_1$-$C_{20}$-alkyl, or very particularly preferably $C_1$-$C_{12}$-alkyl. Examples of linear or branched $C_1$-$C_{12}$-alkyl radicals are methyl, ethyl, propyl, in particular n-propyl, isopropyl, butyl, in particular n-butyl, isobutyl, tert-butyl, pentyl, in particular n-pentyl, isopentyl, tert-pentyl, hexyl, in particular n-hexyl, isohexyl, tert-hexyl, heptyl, in particular n-heptyl, isoheptyl, tert-heptyl, octyl, in particular n-octyl, isooctyl, tert-octyl, nonyl, in particular n-nonyl, isononyl, tert-nonyl, decyl, in particular n-decyl, isodecyl, tert-decyl, undecyl, in particular n-undecyl, isoundecyl, tert-undecyl, or dodecyl, in particular n-dodecyl, isododecyl or tert-dodecyl.

Further preference is given to the radicals $R^6$ each being, independently of one another, linear or branched, optionally substituted $C_2$-$C_{30}$-alkenyl, particularly preferably $C_2$-$C_{20}$-alkenyl and very particularly preferably $C_2$-$C_{12}$-alkenyl. Examples of alkynyl radicals which are particularly preferred according to the invention are ethenyl (vinyl), propenyl, in particular n-propenyl, isopropenyl, butenyl, in particular n-butenyl, isobutenyl, tert-butenyl, pentenyl, in particular n-pentenyl, isopentenyl, tert-pentenyl, hexenyl, in particular n-hexenyl, isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl or tert-dodecenyl.

Further preference is given to the radicals $R^6$ each being, independently of one another, linear or branched, optionally substituted $C_2$-$C_{30}$-alkynyl, particularly preferably $C_2$-$C_{20}$-alkynyl or very particularly preferably $C_2$-$C_{12}$-alkynyl. Examples of alkynyl radicals which are particularly preferred according to the invention are ethynyl, propynyl, in particular n-propynyl, isopropynyl, butynyl, in particular n-butynyl, isobutynyl, tert-butynyl, pentynyl, in particular n-pentynyl, isopentynyl, tert-pentynyl, hexynyl, in particular n-hexynyl, isohexynyl, tert-hexynyl, heptynyl, in particular n-heptynyl, isoheptynyl, tert-heptynyl, octynyl, in particular n-octynyl, isooctynyl, tert-octynyl, nonynyl, in particular n-nonynyl, isononynyl, tert-nonynyl, decynyl, in particular n-decynyl, isodecynyl, tert-decynyl, undecynyl, in particular n-undecynyl, isoundecynyl, tert-undecynyl, or dodecynyl, in particular n-dodecynyl, isododecynyl or tert-dodecynyl.

Further preference is given to the radicals $R^6$ each being, independently of one another, optionally substituted $C_3$-$C_{20}$-cycloalkyl, particularly preferably $C_3$-$C_{12}$-cycloalkyl and particularly preferably $C_3$-$C_6$-cycloalkyl, for example cyclopropyl, cyclobutyl, cyclopentyl or cyclohexyl.

Further preference is given to the radicals $R^6$ each being, independently of one another, optionally substituted $C_3$-$C_{20}$-cycloalkenyl, particularly preferably $C_3$-$C_{12}$-cycloalkenyl and very particularly preferably $C_3$-$C_6$-cycloalkenyl, for example cyclopropenyl, cyclobutenyl, cyclopentenyl or cyclohexenyl.

Further preference is given to the radicals $R^6$ each being, independently of one another, optionally substituted $C_1$-$C_{20}$-heteroalkyl, particularly preferably $C_4$-$C_{12}$-heteroalkyl. The heteroalkyl radicals which are present according to the invention are derived from the abovementioned alkyl radicals, with at least one carbon atom being replaced by a heteroatom selected from among N, O, P and S.

Further preference is given to the radicals $R^6$ each being, independently of one another, optionally substituted $C_5$-$C_{22}$-aryl, particularly preferably $C_5$-$C_{12}$-aryl. Examples of aryl radicals which are preferred according to the invention are phenyl, naphthyl or biaryls.

Further preference is given to the radicals $R^6$ each being, independently of one another, optionally substituted $C_6$-$C_{23}$-alkylaryl, particularly preferably $C_6$-$C_{13}$-alkylaryl. An example of an alkylaryl radical which is preferred according to the invention is benzyl.

Further preference is given to the radicals $R^6$ each being, independently of one another, optionally substituted $C_6$-$C_{23}$-arylalkyl and particularly preferably $C_6$-$C_{13}$-arylalkyl. Examples of arylalkyl radicals which are preferred according to the invention are tolyl, xylyl, propylbenzyl or hexylbenzyl.

Further preference is given to the radicals $R^6$ each being, independently of one another, optionally substituted $C_5$-$C_{22}$-heteroaryl and particularly preferably $C_5$-$C_{12}$-heteroaryl.

The abovementioned radicals $R^6$ may optionally be substituted. Suitable substituents are, for example, selected from among amino, amido, imido, hydroxy, ether, aldehyde, keto, carboxylic acid, thiol, thioether, hydroxamate and carbamate groups. The abovementioned radicals $R^6$ can be mono- or poly substituted. In the case of multiple substitutions, one substituent can be present a plurality of times or various functional groups are simultaneously present. The radicals mentioned for $R^6$ can also be monosubstituted or polysubstituted by the abovementioned alkyl, alkenyl, alkynyl, aryl, alkylaryl, arylalkyl, heteroalkyl or heteroaryl radicals.

In another preferred embodiment, the at least one hydrophobizing substance is selected from the group consisting of $(NaO)(CH_3)Si(OH)_2$, $(NaO)(C_2H_5)Si(OH)_2$, $(NaO)(C_5H_{11})Si(OH)_2$, $(NaO)(C_8H_{17})Si(OH)_2$, $(KO)(CH_3)Si(OH)_2$, $(KO)(C_2H_5)Si(OH)_2$, $(KO)(C_5H_{11})Si(OH)_2$, $(KO)(C_8H_{17})Si(OH)_2$, $(NH_4O)(CH_3)Si(OH)_2$, $(NH_4O)(C_2H_5)Si(OH)_2$, $(NH_4O)(C_5H_{11})Si(OH)_2$, $(NH_4O)(C_8H_{17})Si(OH)_2$, $(NaO)_2(CH_3)Si(OH)$, $(NaO)_2(C_2H_5)Si(OH)$, $(NaO)_2(C_5H_{11})Si(OH)$, $(NaO)_2(C_8H_{17})Si(OH)$, $(KO)_2(CH_3)Si(OH)$, $(KO)_2(C_2H_5)Si(OH)$, $(KO)_2(C_5H_{11})Si(OH)$, $(KO)_2(C_8H_{17})Si(OH)$, $(NH_4O)_2(CH_3)Si(OH)$, $(NH_4O)_2(C_2H_5)Si(OH)$, $(NH_4O)_2(C_5H_{11})Si(OH)$, $(NH_4O)_2(C_8H_{17})Si(OH)$, $(NaO)_3(CH_3)Si$, $(NaO)_3(C_2H_5)Si$, $(NaO)_3(C_5H_{11})Si$, $(NaO)_3(C_8H_{17})Si$, $(KO)_3(CH_3)Si$, $(KO)_3(C_2H_5)Si$, $(KO)_3(C_5H_{11})Si$, $(KO)_3(C_8H_{17})Si$, $(NH_4O)_3(CH_3)Si$, $(NH_4O)_3(C_2H_5)Si$, $(NH_4O)_3(C_5H_{11})Si$, $(NH_4O)_3(C_8H_{17})Si$, $(NaO)(CH_3)_2Si(OH)$, $(NaO)(C_2H_5)_2Si(OH)$, $(KO)(CH_3)_2Si(OH)$, $(KO)(C_2H_5)_2Si(OH)$, $(NaO)_2(CH_3)_2Si$, $(NaO)_2(C_2H_5)_2Si$, $(KO)_2(CH_3)_2Si$, $(KO)_2(C_2H_5)_2Si$, $Ca^{2+}[(O^-)(CH_3)Si(OH)_2]_2$, $Ca^{2+}[(O^-)(C_2H_5)Si(OH)_2]_2$, $Ca^{2+}[(O^-)(C_5H_{11})Si(OH)_2]_2$, $Ca^{2+}[(O^-)(C_8H_{17})Si(OH)_2]_2$, $Ca^{2+}[(O)(CH_3)_2Si(OH)]_2$, $Ca^{2+}[(O^-)(C_2H_5)_2Si(OH)]_2$, $Ca^{2+}[(O^-)_2(CH_3)Si(OH)_2]_2$, $Ca^2[(O^-)_2(C_2H_5)Si(OH)]$, $Ca^{2+}[(O^-)_2(C_5H_{11})Si(OH)]$, $Ca^{2+}[(O^-)_2(C_8H_{17})Si(OH)]$, $Ca^{2+}[(O^-)_2(CH_3)_2Si]$, $Ca^{2+}[(O^-)_2(C_2H_5)_2Si]$ and combinations thereof.

According to the invention the at least one first material to be separated off and the at least one magnetic particle agglomerate in step (A) of the process of the invention. The agglomeration can generally occur as a result of all attractive forces known to those skilled in the art between the at least one first material and the at least one magnetic particle. According to the invention, essentially only the at least one first material and the at least one magnetic particle agglomerate in step (A) of the process of the invention while the at least one second material and the at least one magnetic particle essentially do not agglomerate.

In a preferred embodiment of the process of the invention, the at least one first material and the at least one magnetic particle agglomerate as a result of hydrophobic interactions, different surface charges and/or compounds present in the mixture which selectively couple the at least one first material and the at least one magnetic particle.

The abovementioned alternatives for agglomeration of the at least one first material and the at least one magnetic particle are explained below.

In a first preferred embodiment of step (A) of the process of the invention, the at least one first material and the at least one magnetic particle agglomerate as a result of hydrophobic interactions.

The contacting in step (A) of the process of the invention can occur by all methods known to those skilled in the art. Step (A) is carried out in dispersion, preferably in suspension, particularly preferably in aqueous suspension.

As dispersion media, it is in general possible to use all dispersion media in which the mixture of step (A) is not completely soluble. Suitable dispersion media are, for example, selected from the group consisting of water, water-soluble organic compounds, for example alcohols having from 1 to 4 carbon atoms, and mixtures thereof. In a particularly preferred embodiment, the dispersion medium is water.

Step (A) of the process of the invention is generally carried out at a temperature of from 1 to 80° C., preferably from 20 to 40° C., particularly preferably at ambient temperature.

EMBODIMENT A1

In this preferred embodiment A1 of the process of the invention, step (A) is carried out by firstly bringing the at least one first material comprised in the mixture into contact with a surface-modifying substance in order to hydrophobicize the at least one first material, then bringing this mixture into contact with at least one magnetic particle so that the at least one magnetic particle and the at least one first material which has been hydrophobicized on the surface agglomerate.

According to a particularly preferred embodiment of the process according to the present invention, the at least one magnetic particle is contacted first with the at least one first material comprised in the mixture, and afterwards at least one surface-modifying substance is added, so that the at least one magnetic particle and the at least one first material which has been hydrophobicized on the surface agglomerate.

According to a further preferred embodiment the mixture comprising at least one first material and the at least one second material is contacted with at least one magnetic material and at least one surface-modifying substance at the same time, so that the at least one magnetic particle and the at least one first material which has been hydrophobicized on the surface agglomerate.

For the purposes of the present invention, "surface-active modifying" means a substance which is able to alter the surface of the particle to be separated off in the presence of other particles which are not to be separated off in such a way that attachment of a hydrophobic particle occurs as a result of hydrophobic interactions.

Surface-modifying substances which can be used according to the invention selectively bind to the at least one first material and thereby make the first material suitably hydrophobic. "Selectively" means, for the purposes of the present invention, that the partition coefficient of the surface-modifying substance between the surface of the at least one first material and the surface of the at least one second material is generally >1, preferably >100, particularly preferably >10 000, i.e. the surface-modifying substance preferentially binds to the surface of the at least one first material and not to the surface of the at least one second material.

The process of the invention is preferably carried out using a surface-modifying substance of the general formula (I)

$$A'\text{-}Z'' \tag{I}$$

which binds to the at least one first material, where
A' is selected from among linear or branched $C_2$-$C_{30}$-alkyl, $C_2$-$C_{30}$-heteroalkyl, optionally substituted $C_6$-$C_{30}$-aryl, optionally substituted $C_6$-$C_{30}$-heteroalkyl, $C_6$-$C_{30}$-aralkyl and
Z" is a group by means of which the compound of the general formula (I) binds to the at least one hydrophobic material.

Heteroatoms which may be present according to the invention are selected from among N, O, P, S and halogens such as F, Cl, Br and I.

In a particularly preferred embodiment, A' is a linear or branched $C_2$-$C_{12}$-alkyl, very particularly preferably a linear $C_2$-$C_5$-alkyl, in particular a $C_2$- or $C_4$-alkyl, or a $C_8$-alkyl.

In a further preferred embodiment, A' is preferably a linear or branched, preferably linear, $C_6$-$C_{20}$-alkyl. Furthermore, A' is preferably a branched $C_6$-$C_{14}$-alkyl in which the at least one substituent, preferably having from 1 to 6 carbon atoms, is preferably present in the 2 position, for example 2-ethylhexyl and/or 2-propylheptyl.

In a further particularly preferred embodiment, Z" is selected from the group consisting of anionic groups —$(X)_n$—$PO_3^{2-}$, —$(X)_n$—$PO_2S^{2-}$, —$(X)_n$—$POS_2^{2-}$, —$(X)_n$—$PS_3^{2-}$, —$(X)_n$—$PS_2^-$, —$(X)_n$—$POS^-$, —$(X)_n$—$PO_2^-$, —$(X)_n PO_3^{2-}$—$(X)_n$—$CO_2^-$, —$(X)_n$—$CS_2^-$, —$(X)_n$—$COS^-$, —$(X)_n$—$C(S)NHOH$, —$(X)_n$—$S^-$ where X is selected from the group consisting of O, S, NH, $CH_2$ and n=0, 1 or 2, if appropriate with cations selected from the group consisting of hydrogen, $NR_4^+$ where the radicals R are each, independently of one another, hydrogen or $C_1$-$C_8$-alkyl, an alkali metal or alkaline earth metal. The anions mentioned and the corresponding cations form, according to the invention, uncharged compounds of the general formula (I).

If n=2 in the formulae mentioned, then two identical or different, preferably identical, groups A' are bound to a group Z".

In a particularly preferred embodiment, use is made of compounds selected from the group consisting of xanthates A'-O—$CS_2^-$, dialkyldithiophosphates $(A'-O)_2$—$PS_2^-$, dialkyldithiophosphinates $(A')_2$-$PS_2^-$ and mixtures thereof, where the radicals A' are each, independently of one another, a linear or branched, preferably linear, $C_6$-$C_{20}$-alkyl, preferably n-octyl, or a branched $C_6$-$C_{14}$-alkyl in which the branch is preferably present in the 2 position, for example 2-ethylhexyl and/or 2-propylheptyl. Counterions present in these compounds are preferably cations selected from the group consisting of hydrogen, $NR_4^+$ where the radicals R are each, independently of one another, hydrogen or $C_1$-$C_8$-alkyl, an alkali or alkaline earth metal, in particular sodium or potassium.

Very particularly preferred compounds of the general formula (I) are selected from the group consisting of sodium or potassium ethyl xanthate, sodium or potassium n-octylxanthate, sodium or potassium butylxanthate, sodium or potassium di-n-octyldithiophosphinate, sodium or potassium di-n-octyldithiophosphate and mixtures of these compounds.

In the case of noble metals, for example Au, Pd, Rh etc., particularly preferred surface-active substances are monothiols, dithiols and trithiols or 8-hydroxyquinolines, for example as described in EP 1200408 B1.

In the case of metal oxides, for example FeO(OH), $Fe_3O_4$, ZnO etc., carbonates, for example azurite $[Cu(CO_3)_2(OH)_2]$, malachite $[Cu_2[(OH)_2CO_3]]$, particularly preferred surface-active substances are octylphosphonic acid (OPA), $(EtO)_3Si$-A, $(MeO)_3Si$-A, with the abovementioned meanings for A'. In a preferred embodiment of the process of the invention, no hydroxamates are used as surface-active substances for modifying metal oxides.

In the case of metal sulfides, for example $Cu_2S$, $MoS_2$, etc., particularly preferred surface-active substances are monothiols, dithiols and trithiols or xanthogenates.

In a further preferred embodiment of the process of the invention, Z" is —$(X)_n$—$CS_2^-$, —$(X)_n$—$PO_2^-$ or —$(X)_n$—$S^-$ where X is O and n is 0 or 1 and a cation selected from among hydrogen, sodium and potassium. Very particularly preferred surface-active substances are 1-octanethiol, potassium n-octylxanthate, potassium butylxanthate, octylphosphonic acid or a compound of the formula (IV)

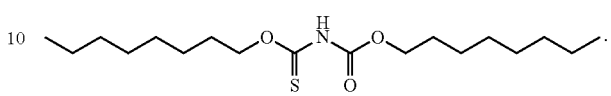

(IV)

The at least one surface-modifying substance is generally used in an amount which is sufficient to achieve the desired effect. In a preferred embodiment, the at least one surface-modifying substance is added in an amount of from 0.005 to 5% by weight, in each case based on the total solid present in the mixture to be treated.

Further details of this embodiment are disclosed in WO 2009/030669 A2.

In another preferred embodiment, the surface modifying agent is a collector. According to a preferred embodiment of the process according to the present invention, the at least one collector is a compound of the general formula (Ia) or derivative thereof $$[(A)_m(Z)_{n'}]_o \quad (Ia)$$

wherein each A is independently selected from linear or branched $C_1$-$C_{30}$-alkyl, $C_2$-$C_{30}$-alkenyl $C_1$-$C_{30}$-heteroalkyl, optionally substituted $C_6$-$C_{30}$-aryl, $C_6$-$C_{30}$-cycloalkyl, $C_6$-$C_{30}$-heteroalkyl, $C_6$-$C_{30}$-heterocycloalkyl, $C_6$-$C_{30}$-aralkyl, each of which may be unsubstituted or optionally substituted;

and each Z is independently selected from anionic groups, cationic groups or non-ionic groups;

m is an integer number of 1, 2, 3, 4, 5, 6, 7, 8, 9 or 10;

n' is an integer number of 1, 2, 3, 4, 5, 6, 7, 8, 9 or 10; and o is an integer number of 1, 2, 3, 4, 5, 6, 7, 8, 9 or 10 to 100.

It is understood that formula (I) includes all possible combinations of how each A and each Z may be attached to one another. This includes any linear attachment, such as in -A-A-Z—Z—, A-Z-A-Z—, —Z-A-Z-A- and the like; branched attachments, such as in

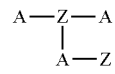

and the like; and circular attachments such as in

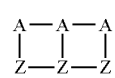

and the like. The skilled person is able to identify suitable attachment sites, such as substitution sites, in substituent A and Z that allow the attachment.

Furthermore, particularly preferred attachment sites are indicated in the respective definition of substituent Z.

In a particularly preferred embodiment, A is a linear or branched $C_1$-$C_{14}$-alkyl, and preferably a linear $C_4$-alkyl or $C_8$-alkyl.

In a further preferred embodiment, A is preferably a branched $C_1$-$C_{20}$-alkyl, particularly preferably a branched $C_6$-$C_{14}$-alkyl, wherein preferably at least one branch, preferably a branch having 1 to 6 carbon atoms, is attached in 2-position, such as in 2-ethylhexyl and/or 2-propylheptyl. Corresponding compounds being substituted in 2-position are, for example, obtained using the Guerbet reaction that is known to the skilled artisan as one reaction step.

In a preferred embodiment, Z is selected as an anionic group. Non-limiting examples of anionic groups are

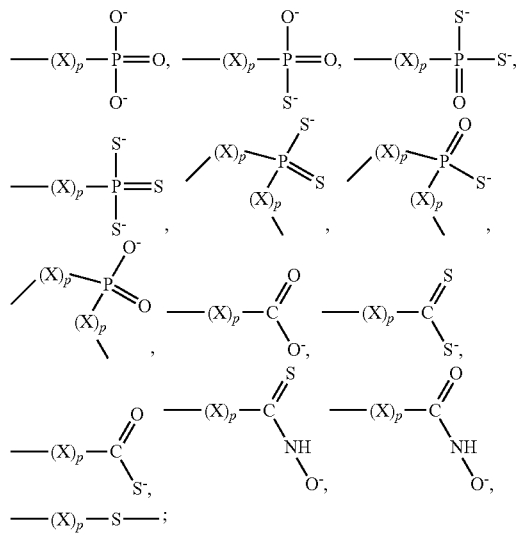

wherein each X is independently selected from the group consisting of O, S, NH, $CH_2$; and each p is independently selected from 0, 1 or 2.

In a preferred embodiment, the anionic group is present as a salt with at least one cation wherein preferably the at least one cationic counter ion is selected from the group consisting of hydrogen, $N(R^1)_4^+$; wherein each $R^1$ is independently selected from hydrogen, $C_1$-$C_8$-alkyl, hydroxy-substituted $C_1$-$C_8$-alkyl or $C_1$-$C_8$-heteroalkyl, preferably HO—$CH_2CH_2$— or HO—$CH_2CH_2$—O—$CH_2CH_2$—; alkali- or earth alkali metals, preferably sodium or potassium; or combinations thereof.

The negatively charged anionic groups may of course also be present in a protonated form, depending, for example, on the pH of the aqueous environment. For example, the —$(X)_p$—$S^-$ anion group may be present as a —$(X)_p$—SH neutral group.

In another preferred embodiment, Z is selected as a cationic group. Non-limiting examples of cationic groups include, but are not limited to,

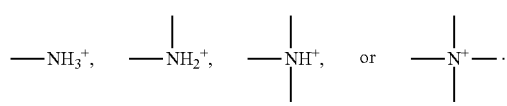

The cationic group may of course also be present in a deprotonated form, depending, for example, on the pH. For instance, —$NH_3^+$ may also be present as —$NH_2$.

In another preferred embodiment, Z is selected as a non-ionic group. Examples of non-ionic groups include, but are not limited to, —$X_A$—,

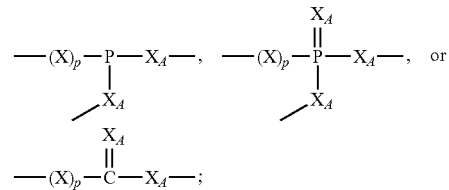

wherein each X is defined as indicated above and each $X_A$ is independently O or S.

In a preferred embodiment, the at least one collector is a compound of formula (IA) or derivative thereof $$A\text{-}Z_1\text{-}A \tag{IA}$$

wherein each A is selected as described above and wherein $Z_1$ is selected from the group consisting of

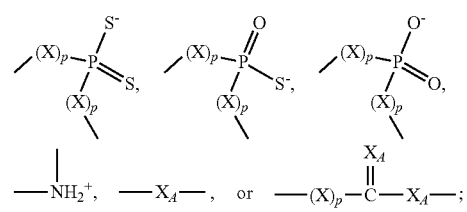

wherein X, $X_A$ and p are defined as described above.

In another preferred embodiment, the at least one collector is a compound of formula (IB) or derivative thereof $$A\text{-}Z_1\text{-}A\text{-}Z_2 \tag{IB}$$

wherein A and $Z_1$ are defined as described above and wherein $Z_2$ is selected from the group consisting of

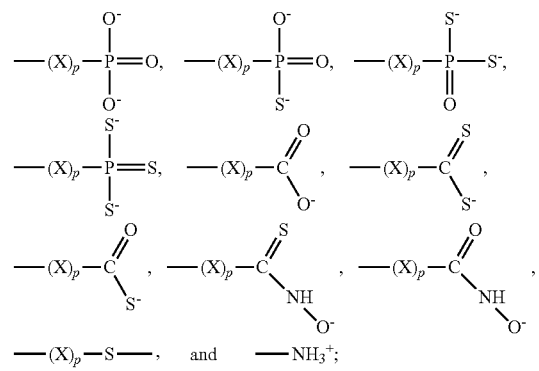

and —$NH_3^+$; and
wherein X and p are as defined above.

In yet another preferred embodiment, the at least one collector is a compound of formula (IC) or derivative thereof $$\begin{array}{c} A\text{—}Z_3\text{—}A \\ | \\ A \end{array} \tag{IC}$$

wherein A is selected as defined above and wherein $Z_3$ is selected from the group consisting of

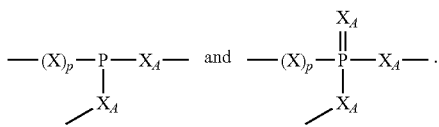

In yet another preferred embodiment, the at least one collector is a compound of formula (ID) or formula (IE),

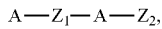  (ID)

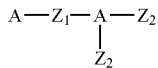  (IE)

wherein A, $Z_1$, and $Z_2$ are defined as described above.

In yet another embodiment, the at least one collector is a compound of formula (IF) or (IG) or derivatives thereof

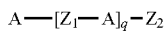  (IF)

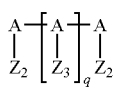  (IG)

wherein q is an integer of 1, 2, 3, 4 or 5 to 100 and A, $Z_1$, $Z_2$ or $Z_3$ are defined as described above.

In a further preferred embodiment, the at least one collector is selected from
(i) xanthates, preferably xanthates of formula (IH) or (IJ) or derivatives thereof

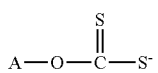  (IH)

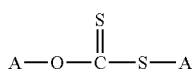  (IJ)

(ii) dithiophosphates, preferably dithiophosphates of formula (IK) or derivatives thereof

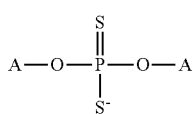  (IK)

(iii) dithiophosphinates, preferably dialkyldithiophosphinates of formula (IL) or derivatives thereof

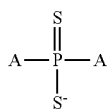  (IL)

(iv) dialkyldithiocarbamates, preferably dialkyldithiocarbamates of formula (IM) or derivatives thereof

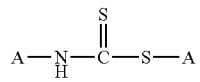  (IM)

or
(v) alkyltrithiocarbamates preferably alkyltrithiocarbamates of formula (IN) or derivatives thereof

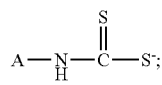  (IN)

or mixtures thereof, wherein each A is defined as described above. In a preferred embodiment, each A is independently selected from a group consisting of a linear or branched and preferably linear $C_6$-$C_{20}$-alkyl, more preferably n-octyl; or a branched $C_6$-$C_{14}$-alkyl, wherein the branch is preferably located in 2-position, for example 2-ethylhexyl and/or 2-propylheptyl.

In an especially preferred embodiment, the at least one collector is selected from the group consisting of sodium- or potassium-n-octylxanthate, sodium- or potassium-butylxanthate, sodium- or potassium-di-n-octyldithiophosphinate, sodium- or potassium-di-n-octyldithiophosphate, sodium- or potassium-di-n-octyidithiocarbamates, sodium- or potassium-ethyl-hexyl-xanthate and mixtures thereof.

In a particularly preferred embodiment, the at least one collector is selected from the group consisting of potassium-n-octyl xanthate (1:1 salt of carbonodithionic acid O-ocytyl ester) or potassium-di-n-octyldithiophosphinate or mixtures thereof.

EMBODIMENT A2

In this further embodiment A2 of step (A) of the process of the invention, the mixture to be treated is firstly brought into contact with at least one hydrocarbon in an amount of from 0.01 to 0.4% by weight, based on the sum of the mixture to be treated and the at least one hydrocarbon, and this mixture is then brought into contact with the at least one magnetic particle. Embodiment A2 is particularly advantageous when not only the at least one first material and at least one second material but also at least one third material are present. The at least one third material is preferably selected from the group which has been mentioned above for the at least one second material, with at least one second material and at least one third material being different.

For the purposes of the present invention, a hydrocarbon is an organic chemical compound which is made up essentially of carbon, hydrogen and optionally oxygen. If oxygen is present in addition to carbon and hydrogen in the hydrocarbons which can be used according to the invention, it is present in the form of, for example, ester, carboxyl and/or ether groups. In step (A) according to embodiment A2 of the process of the invention, it is possible to use either an essentially uniform hydrocarbon or a hydrocarbon mixture.

Hydrocarbons or hydrocarbon mixtures which can be used according to the invention generally have a low viscosity under the conditions of the process of the invention, so that they are liquid and mobile under the process conditions according to the invention. Preference is given to using hydrocarbons or hydrocarbon mixtures which have a viscosity of from 0.1 to 100 cP, preferably from 0.5 to 5 cP, in each case at 20° C.

Hydrocarbons or hydrocarbon mixtures which can be used according to the invention generally have a flash point of 20° C., preferably ≥40° C. The present invention therefore also provides the process according to the invention in which the at least one hydrocarbon has a flash point of 20° C., particularly preferably 40° C.

In a preferred embodiment of the process of the invention, the at least one hydrocarbon is selected from the group consisting of mineral oils, vegetable oils, biodiesel, BtL (biomass-to-liquid) fuels, products of coal liquefaction, products of the GI (gas-to-liquid, from natural gas) process and mixtures thereof.

Mineral oils are, for example, crude oil derivatives and/or oils produced from brown coal, hard coal, turf, wood, crude oil and if appropriate also other mineral raw materials by distillation. Mineral oils generally comprise hydrocarbon mixtures of paraffinic hydrocarbons, i.e., saturated chain-like hydrocarbons, naphthenic hydrocarbons, i.e. saturated cyclic hydrocarbons, and aromatic hydrocarbons.

A particularly preferred crude oil derivative is diesel or gas oil. Diesel generally has a composition known to those skilled in the art. Diesel is based essentially on mineral oil, i.e. diesel is a fraction obtained in the separation of mineral oil by distillation. The main constituents of diesel are alkanes, cycloalkanes and aromatic hydrocarbons having from about 9 to 22 carbon atoms per molecule and a boiling range from 170° C. to 390° C.

Further terms used for suitable petroleum derivatives comprise: light gas oil (boiling point 235-300° C., depending on the spec. also known as "diesel", "diesel fuel", "DF", "light heating oil" "HEL"), heavy gas oil (boiling point 300-375° C.) and also (in the USA) "No, 2 fuel".

Vegetable oils are generally the fats and fatty oils obtained from oil plants. Vegetable oils comprise, for example, triglycerides. Vegetable oils which are suitable for the purposes of the invention are, for example, selected from the group consisting of sunflower oil, rapeseed oil, safflower oil, soybean oil, maize germ oil, peanut oil, olive oil, herring oil, cottonseed oil, palm oil and mixtures thereof.

Biodiesel generally has a composition known to those skilled in the art. Biodiesel comprises essentially methyl esters of saturated $C_{16}$-$C_{18}$ fatty acids and unsaturated $C_{18}$ fatty acids, in particular the methyl ester of rapeseed oil.

Products of coal liquefaction can be obtained, for example, by the Fischer-Tropsch or Sasol process. The BtL and GtL processes are known to those skilled in the art.

In a preferred embodiment of the process of the invention, diesel, kerosene and/or light gas oil are used as hydrocarbon in step (A). On the laboratory scale, diesel of the brands Solvesso® and/or Shellsol® can advantageously be used.

If appropriate, at least one hydrophobicizing agent can additionally be added in step (A) according to embodiment A2 of the process of the invention. Suitable hydrophobicizing agents are the abovementioned compounds of the general formula (I).

EMBODIMENT A3

In this further preferred embodiment A3 of step (A) of the process of the invention, the at least one magnetic particle is brought into contact with at least one bifunctional molecule of the general formula (VI)

$$(F^1)_x\text{-}(A'')_{n''}\text{-}(F^2)_y \qquad (VI),$$

where
$F^1$ is a functional group which binds selectively to the at least one magnetic particle,
$F^2$ is a functional group which binds selectively to the at least one first material,
A" is a structural unit selected from among $CR'H_2$ groups where R' is selected from among hydrogen and a linear or branched carbon radical having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units,
n" is an integer from 1 to 100
x is an integer from 1 to 4 and
y is an integer from 1 to 4,
or an adduct of the two is brought into contact with the mixture comprising the at least one first material and at least one second material, so that an adduct of the at least one magnetic particle, the bifunctional compound of the general formula (VI) and the at least one first material is formed.

$F^1$ and $F^2$ are in each case functional groups which bind selectively to the at least one magnetic particle ($F^1$) or to the at least one first material ($F^2$).

For the purposes of the present invention, "selectively" means that the respective functional group $F^1$ or $F^2$ binds to an extent of from 50 to 95%, preferably from 70 to 98%, particularly preferably from 80 to 98%, based on $F^1$, to the at least one magnetic particle or, based on $F^2$, to the at least one first material, in each case in the presence of the at least one second material, in each case based on all bonds between functional groups and components present in the mixture.

In a preferred embodiment, $F^1$ is a functional group which in the presence of silicates binds selectively to the at least one magnetic particle, particularly preferably a functional group selected from among the phosphonic acid group —OP(OH)$_2$ and the carboxyl group —COOH.

In a further preferred embodiment, $F^2$ is a functional group which binds to the at least one first material in the presence of oxidic ores, for example the abovementioned ores, in particular $SiO_2$ or albite, particularly preferably a functional group selected from the group consisting of the thiol group —SH, the hydroxy group —OH, xanthogenate —OCSSH, thiolate —S$^-$, the dihydroxy group, for example the 1,2-dihydroxy or 1,3-dihydroxy group, a dithiol group, for example a 1,2-dithiol or 1,3-dithiol group, a thiohydroxy group, for example a 1,2-thiohydroxy or 1,3-thiohydroxy group, functional groups of the general formula (III) and mixtures thereof.

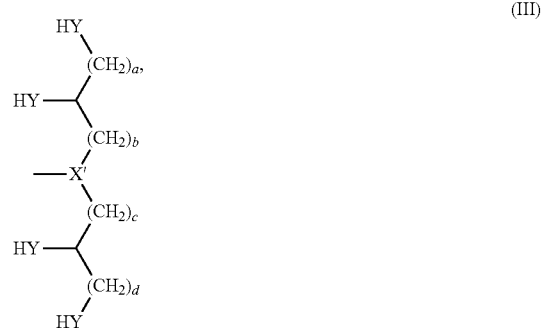

where
the radicals Y are each, independently of one another, S, NH, O, preferably independently of one another S or O,
X' is N, P, $CH_2$, preferably N,
a, b, c, d are each, independently of one another, an integer from 1 to 6, preferably 1 or 2.

Functional groups $F^2$ of the general formula (III) are bound to $-(A'')_{n''}$- via the free bond on X.

Very particularly preferred functional groups $F^2$ of the general formula (III) are selected from the group of compounds of the formulae (IIIa), (IIIb), (IIIc), (IIId) and (IIIe):

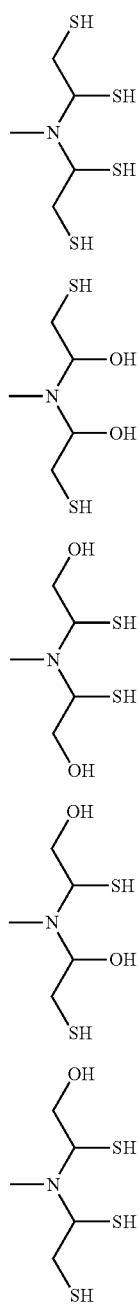

(IIIa)

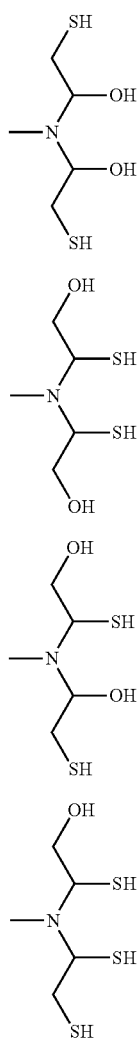

(IIIb)

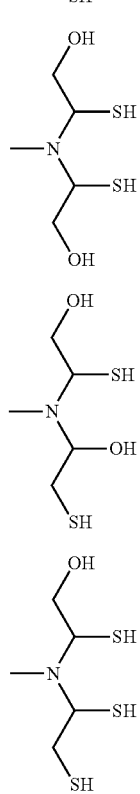

(IIIc)

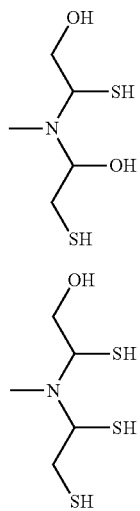

(IIId)

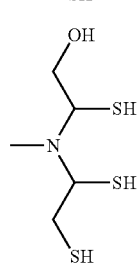

(IIIe)

In the general formula (VI), A'' is a structural unit selected from among $CR'H_2$ groups where R' is selected from among hydrogen and a linear or branched carbon radical having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units, preferably a $CH_2$ group, with it also being possible according to the invention for C—C— double and/or triple bonds to be present in the skeleton of the bifunctional compounds formed by $-(A'')_{n''}$—. Heteroatoms are, for example, O, S, N and/or P. Suitable aromatic or heteroaromatic units are, for example, selected from among substituted or unsubstituted aromatic or heteroaromatic units having from 6 to 20 carbon atoms and if appropriate heteroatoms, for example phenyl, benzyl and/or naphthyl. The aromatic units can be incorporated into the chain via the 1,2, 1,3 and/or 1,4 positions.

In the compound of the general formula (VI), x' and y indicate the number of functional groups $F^1$ or $F^2$ present in the molecule. Preference is given to x' and y each being, independently of one another, 1, 2 or 3, particularly preferably 1 or 2, very particularly preferably 1.

A very particularly preferred compound of the general formula (VI) is (2-mercapto-phenyl)phosphonic acid.

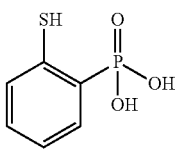

In a preferred embodiment of the process of the invention, the functional group $F^1$ in the compound of the general formula (VI) binds to the at least one magnetic particle and the functional group $F^2$ in the compound of the general formula (VI) binds to the at least one first material.

In further embodiments of the process of the invention, the mixture to be treated can firstly be brought into contact with at least one hydrophobicizing agent so that an adduct of the at least one hydrophobicizing agent and the at least one first material is formed, this adduct is then brought into contact with at least one magnetic particle functionalized on the surface by at least one polymeric compound which has an LCST (Lower Critical Solution Temperature) at a temperature at which the polymeric compound has hydrophobic character, so that the adduct and the at least one functionalized magnetic particle agglomerate or step (A) is carried out by producing a suspension of the mixture comprising at least one first material and at least one second material and at least one magnetic particle in a suitable suspension medium and setting the pH of the resulting suspension to a value at which the at least one first material and the at least one magnetic particle have opposite surface charges, so that they agglomerate.

In all embodiments of step (A) of the process of the invention, preferably an energy input of at least 10 kWh/m³, preferably at least 100 kWh/m³, particularly preferably at least 1000 kWh/m³, is introduced in step (A). The energy introduced in step (A) is not more than 20 000 kWh/m³, preferably not more than 10 000 kWh/m³.

In a further preferred embodiment of the process of the invention, a shear rate of at least 5000 1/s, preferably at least 10 000 1/s, particularly preferably 20 000 1/s, is present in step (A). The shear rate present in step (A) is not more than 30 000 1/s, particularly preferably not more than 50 000 1/s.

In a very particularly preferred embodiment of the process of the invention, an energy input of at least 10 kWh/m³, preferably at least 100 kWh/m³, particularly preferably at least 1000 kWh/m³, is introduced in step (A) and a shear rate of at least 5000 1/s, preferably at least 10 000 1/s, particularly preferably 30 000 1/s, is present in step (A).

It is the high energy input according to the invention which is introduced into the dispersion in step (A), preferably in combination with a high shear rate, which makes it possible for very intensive mixing to be obtained in step (A) in order to bring the at least one first material and the at least one magnetic particle into contact to a sufficient extent and thus couple the corresponding surfaces. Such improved coupling enables the degree of separation achieved in the process of the invention to be increased.

In the process of the invention, in particular step (A), agglomerates of at least one first material and at least one second material can be separated at least briefly during dispersion so that contact between the at least one first material and the at least one magnetic particle is made possible and steric blocking of the at least one first material, for example by the at least one second material, can be eliminated in this way.

The high energy input and the high shear rate which is preferably present according to the invention in step (A) are, according to the invention, achieved by, in particular, in-line dispersers (rotor/stator principle), T-mixers and other high-intensity mixers. In these preferred embodiments, dispersion is effected by high-energy particle-particle impact.

Due to the high energy input according to the invention in step (A), particularly homogeneous mixing of the mixture to be treated is achieved. This enables the efficiency of the process to be increased compared to processes in which agglomerate formation is carried out without input of a high quantity of energy. As a result, the amount of at least one second material in the ore/magnetic particle mixture discharged can be decreased according to the invention, so that during a subsequent work-up of the ore, for example by smelting, less slag is formed, so that the overall space-time yield of the process can be increased.

Step (B):

Optional Step (B) of the process according to the present invention comprises addition of at least dispersion medium to the mixture or dispersion of step (A).

The mixture obtained in step (A) comprises, in one embodiment, at least one dispersion medium, agglomerates of at least one first material and at least one magnetic particle, at least one second material and, if appropriate, surface-modifying substances, polymeric compounds, etc., depending on which embodiment has been carried out in step (A).

Step (B) can be carried out, i.e. further dispersion medium is added, in order to obtain a dispersion having a lower concentration.

Suitable dispersion media are all dispersion media which have been mentioned above with regard to step (A). In a particularly preferred embodiment, the dispersion medium in step (B) is water.

In general, the amount of dispersion medium added in step (A) and optionally in step (B), according to the invention, can be selected so that a dispersion which is readily stirrable and/or conveyable is obtained. In a preferred embodiment, the amount of mixture to be treated based on the total slurry or dispersion is up to 90% by weight, particularly preferably from 5 to 50% by weight.

In a preferred embodiment of the process of the invention, step (B) is not carried out but instead step (A) is carried out from the beginning in an aqueous dispersion having an appropriate concentration.

The optional addition of dispersion medium in step (B) of the process of the invention can, according to the invention, be carried out by all methods known to those skilled in the art.

Step (C):

Step (C) of the process according to the present invention comprises the separation of at least part of the at least one second material due to its different settling velocity under gravitation compared to the magnetic agglomerates of the at least one first material and at least one magnetic particle, from the dispersion of step (A) or (B), to obtain a dispersion comprising a lower amount of the at least one second material.

According to a preferred embodiment, step (C) of the process according to the present invention is conducted by applying gravitational force and a stream of the at least one dispersion medium in opposite direction of gravitational force onto the dispersion of step (A). According to a preferred embodiment of step (C) of the process according to the present invention, optional step (B), addition of at least one dispersion medium to the mixture or dispersion of step (A), is conducted during step (C). This preferred embodiment has the advantage that the addition of additional dispersion medium and the solid-solid separation process are carried out simultaneously, saving one process step (B).

The present invention therefore preferably relates to the process according to the present invention, wherein step (C) is conducted by applying gravitational force and a stream of the at least one dispersion medium in opposite direction of gravitational force onto the dispersion of step (A).

According to a further preferred embodiment of the present invention, step (C) is conducted by introducing the dispersion of step (A) or (B) into a suitable apparatus that is known to the skilled artisan, for example a vertical arranged column, particularly preferably according to FIG. 1, through which the dispersion is preferably introduced at the lower end, partially flows to the upper end and preferably partially sediments to the lower end. Therewith, the gravitational force preferably acts onto the particles and, due to differences in particle sizes and in particle densities between the magnetic agglomerates and the at least one second material, allowing the former to sediment and the latter non agglomerated at least one second material to flow upward with a slower upward velocity than the dispersion medium. This method is in general known to the skilled artisan and is called "elutriation". It is, for example, described in R. Körber, Ullmann's Encyclopedia of Industrial Chemistry, 2012, Wiley-VCH Verlag, Weinheim, pages 443 to 455.

With step (C) of the process according to the present invention, particles having different particles sizes and/or densities are separated due to their different settling velocities.

For example, particles having a larger particle size ("d") are settling slower than smaller particles. In addition, particles having a higher density ("$\rho$") settle faster than particles having a lower density. In general, for simplicity, the relation between settling velocities in a creeping flow regime can be easily derived from a balance between gravitational, buoyant and drag forces to:

$$\frac{v_{p,agglo}}{v_{p,gangue}} = \frac{\frac{(\rho_{p,agglo} - \rho_f)}{\mu_f} \frac{g}{18} d_{p,agglo}^2}{\frac{(\rho_{p,gangue} - \rho_f)}{\mu_f} \frac{g}{18} d_{p,gangue}^2}$$

"$v_p$" refers to the velocity of particles, "$\mu$" refers to the viscosity, "g" refers to gravitational acceleration; subscript "p, agglo" refers to particles behaving as an agglomerate, subscript "p, gangue" refers to non-agglomerated one second material, preferably gangue, "f" refers to the fluid slurry phase.

From the formula it is easily recognizable that as the difference between the density and mean particle size of the magnetic agglomerates and the at least non one second material becomes larger, the separation efficiency is increased. According to the present invention, the fluid velocity upward and accordingly the diameter of the column is preferably chosen so that the absolute value of the mean fluid velocity "v-fluid" is larger than the mean settling velocity of the at least one second material, preferably the gangue of an ore to be treated, and lower than mean settling velocity of the magnetic agglomerates of the at least one first material, preferably the value of an ore to be treated, and the magnetic particles. With this, the movement in opposite directions can preferably be achieved and the desired separation of solids can take place.

According to the present invention, in step (C) of the process described above, the at least one second material, preferably the gangue of the ore to be treated, is separated from the dispersion, before magnetic separation is conducted. This has the advantage, that a dispersion can be introduced into the magnetic separation step comprising a lower amount of non magnetic material, compared to a process, wherein step (C) is not conducted, which further increases the separation efficiency of the whole process. In addition, smaller or less apparatuses for the magnetic separation step can be used, which is further increasing the scalability, separation- and cost-efficiency of the whole process.

According to a preferred embodiment, the at least one second material is collected at the top of the column that is preferably used in step (C) of the process according to the present invention. Further preferred, the magnetic agglomerates are collected at the bottom of the column that is preferably used in step (C) of the process according to the present invention.

According to the present invention, at least 50% by weight of the whole amount of the at least one second material being present in the mixture that is originally introduced into the process is separated off in step (C).

Further preferred, with conducting step (C) of the process according to the present invention, the suspension volume and solid mass flows that are to be introduced into the magnetic separation step (D) can be reduced to less than 50%, preferably less than 40%, more preferably less than 30%, even more preferred less than 20%, in each case of the original suspension volume and solid mass flows.

The flow velocity of the dispersion within the column is for example 0.3 to 100 mm/s, preferably 1 to 50 mm/s. The optimum depends on the particle size ratio and density ratio between the magnetic agglomerates and the one second material.

The volumetric flow rate will depend on the scale of the process combined with the necessary flow velocity.

Step (C) of the process according to the present invention is preferably conducted at a temperature of 0 to 50° C., preferably 5 to 30° C., particularly preferably ambient conditions.

Step (C) of the process according to the present invention is preferably conducted at a pressure of 1 (in particular 1.01325 (atmospheric conditions) bar) to 5 bar (a), preferably 1.2 to 2 bar (a).

Step (D):

Step (D) of the process according to the present invention comprises the separation of the magnetic agglomerates from the dispersion of step (C) by application of a magnetic field.

In general, step (D) can be carried out with any magnetic equipment that is suitable to separate magnetic particles from dispersion, e.g. drum separators, high or low intensity magnetic separators, continuous belt type separators or others.

Step (D) can be carried out by introducing a permanent magnet into the reactor in which the mixture from step (A), (B) or (C) is present. In a preferred embodiment, a dividing wall composed of nonmagnetic material, for example the wall of the reactor, is present between permanent magnet and mixture to be treated. In a further preferred embodiment of the process of the invention, an electromagnet which is only magnetic when an electric current flows is used in step (D). Suitable apparatuses are known to those skilled in the art.

The magnetic agglomerates can be separated from the magnetic surface and/or the unit wherein magnetic separation is conducted according to the present invention by all methods known to those skilled in the art.

In a preferred embodiment the magnetic agglomerates are removed by flushing with a suitable dispersion medium. Suitable dispersion media have been mentioned above. In a preferred embodiment, water is used to flush the separated magnetic agglomerates.

In a preferred embodiment, the magnetic separation equipment allows to wash the magnetic concentrate while the separation with a dispersant, preferably water. This washing preferably allows removing inert material from the magnetic concentrate leading to higher grades of the valuables.

In a preferred embodiment, step (D) is conducted continuously or semi-continuously, wherein preferably the mixture to be treated flows through a separator, preferably in dispersion. Flow velocities of the dispersion to be treated are in general adjusted to obtain an advantageous yield of magnetic agglomerates separated. In a preferred embodiment, flow velocities of the dispersion to be treated are 10 mm/sec. to 1000 mm/sec.

The pH-value of the dispersion which is treated according to step (D) is in general neutral or weakly basic, being a pH-value of 6 to 13, preferably 8 to 12. In a preferred embodiment, no adjustment of pH-value of the dispersion obtained in step (A) or (B) is necessary.

According to a preferred embodiment, step (D) of the process according to the present invention is conducted continuously in a magnetic separation device comprising a canal through which the dispersion to be treated flows. Magnets are arranged at the outside of the canal and apply a movable magnetic field onto the dispersion. Inlets and Outlets are arranged in a way that dispersion can be introduced into the apparatus, and magnetic agglomerates and at least one second material are taken out of the apparatus at different outlets. A particular process and apparatus for step (D) of the process according o the present invention is disclosed in WO2011/058033, WO2011/064757, International Patent Application PCT/EP2013/059550 and WO 2012/104292.

Step (D) of the process of the invention can be carried out at any suitable temperature, for example from 10 to 60° C., preferably at ambient temperature.

In a continuous or semi-continuous process the mixture is preferably mixed by turbulent flow, and is preferably not additionally stirred.

After step (D) of the process according to the present invention, the agglomerate of at least one first material that is to be separated according to the present invention, at least one surface-modifying substance and at least one magnetic particle is separated from the at least one second material. Preferably both fractions that are obtained are present as dispersions in at least one dispersion medium, preferably in water.

Step (E):

Optional step (E) of the process of the invention comprises cleavage of the agglomerate which has been separated off in step (D) to obtain the at least one first material and the at least one magnetic particle separately.

The present invention therefore preferably relates to the process according to the present invention, wherein the process further comprises a step (E) that is conducted after step (D):

(E) Cleavage of the agglomerate obtained in step (D) in order to obtain the at least one first material and the at least one magnetic particle separately.

In a preferred embodiment of the process of the invention, the cleavage in step (E) is carried out in a nondestructive manner, i.e. the individual components present in the dispersion are not changed chemically. For example, the cleavage according to the invention is preferably not affected by oxidation of the hydrophobizing agent, for example to give the oxidation products or degradation products of the hydrophobizing agent.

Cleavage can be carried out by all methods known to those skilled in the art which are suitable for cleaving the addition product in such a way that the at least one magnetic particle can be recovered in reusable form. In a preferred embodiment, the magnetic particle which has been cleaved off is reused in step (A) of the process according to the present invention.

In a preferred embodiment, the cleavage in step (E) of the process of the invention is affected by treatment of the addition product with a substance selected from the group consisting of organic solvents, basic compounds, acidic compounds, oxidants, reducing agents, surface-active compounds and mixtures thereof.

Examples of basic compounds which can be used according to the invention are aqueous solutions of basic compounds, for example aqueous solutions of alkali metal and/or alkaline earth metal hydroxides, for example KOH, NaOH, lime water, aqueous ammonia solutions, aqueous solutions of organic amines of the general formula $R^2{}_3N$, where the radicals $R^2$ are selected independently from the group consisting of $C_1$-$C_8$-alkyl which may optionally be substituted by further functional groups.

Examples of surface-active compounds which can be used according to the invention are nonionic, anionic, cationic and/or zwitterionic surfactants. In a preferred embodiment, the cleavage is made by the use of biodegradable, preferably nonionic, surfactants with concentrations in the range of the critical micelle concentrations. In a preferred embodiment, the addition product of hydrophobic material and magnetic particle is cleaved by means of biodegradable nonionic surfactants, further preferably added in an amount slightly, for example up o 5%, more preferably up to 3%, above the critical micelle concentration of the surfactant.

A particularly preferred nonionic surfactant that is used in step (E) of the process according to the present invention is at least one compound selected from the group consisting of compounds of general formula (I'),

wherein
$R^7$ denotes a branched or linear, substituted or unsubstituted aliphatic hydrocarbon moiety having from 7 to 20 carbon atoms or substituted or unsubstituted $C_6$-$C_{30}$-aryl,
PO denotes a propoxy moiety,
EO denotes an ethoxy moiety,
n''' is in each of the t sections, independently of one another, from ≥0 to ≤20,
m' is in each of the t sections, independently of one another, from ≥0 to ≤90,
t is from ≥1 to ≥20,
with the proviso that the overall number of propoxy moieties and ethoxy moieties is in the range of ≥1 to ≤100, After optional cleavage according to step (E), the at least one first material and the at least one magnetic particle are, according to the invention, present as dispersion in the abovementioned cleavage reagent, preferably in a mixture of water and surfactant.

For example, the at least one magnetic particle is separated from the dispersion comprising this at least one magnetic particle and the at least one first material by means of a permanent magnet or electromagnet. Details of the separation are analogous to step (D) of the process of the invention.

The first material to be separated off, preferably the metal compound to be separated off, is preferably separated from the dispersion medium by drying.

The process according to the present invention comprises steps (A) to (D), wherein particles or agglomerates are obtained comprising at least one magnetic particle and at least one metal. In a particularly preferred embodiment these particles or agglomerates are suitable for direct work-up without optional step (E) according to the present invention to obtain the at least one metal in pure form.

The present invention further relates to the process according to the present invention, wherein after step (D) or step (E) the following step (F) is conducted:

(F) further processing of the particles or of the agglomerate from step (D) or (E) via smelting, extracting and/or wet chemical refining.

The magnetic particles or agglomerates obtained in step (D) preferably comprise iron comprising magnetic substances or magnetic particles in addition to at least one first material, being for example at least one precious metal. Because iron is essentially necessary for melting and/or smelting processes to obtain the at least one first material in pure or enriched form, the particles or agglomerates that are obtained in step (D) of the process according to the present invention can directly be treated in a smelting and/or melting process.

In the case that noble metals are used as first material in combination with iron comprising magnetic particles, no need for further addition of other iron containing compounds may exist. Instead, the magnetic iron oxide particles loaded with precious metals are added to the furnace feed in place of iron oxide otherwise added to the process.

In a further embodiment of the process according to the present invention, step (F) is conducted according to the present invention after step (E).

Smelting, extracting and/or wet chemical refining are conducted according to methods that are known to the skilled artisan.

As used herein, the term "dispersion" refers to material comprising more than one phase wherein at least one of the phases consists of finely divided phase domains, often in the colloidal size range, dispersed throughout a continuous phase.

As used herein, the term "derivative" such as in "a compound of formula (I) or derivatives thereof" preferably refers to salts, the protonated form or the deprotonated form of said compounds. Preferred salts as derivatives of a compound wherein the compound represents the anionic part of the salt include salts wherein the respective one or more cation of the salt is sodium, potassium, calcium, magnesium or $N(R^1)_4+$, wherein $R^1$ is an unsubstituted or substituted $C_1$-$C_{12}$-alkyl Preferred salts as derivatives of a compound wherein the compound is the cation include salts wherein the respective one or more anion of the salt is Cl, Br, I, F, carbonate, phosphate, sulphate, sulphide or hydroxide and the like. The person skilled in the art is aware that the protonated and/or deprotonated form of a compound may depend on the pH in a dispersion.

As used herein, the term "optionally substituted" refers to a group that is either unsubstituted or substituted, e.g. with 1, 2, 3, 4 or 5 substituents. Preferred substituents are F, Cl, Br, I, OH, SH, —COOH, —NH$_2$, —CN, —C(O)NH$_2$ (amido), —C(O)NHC(O)—C$_1$-C$_{30}$-alkyl (imido), —O—C$_1$-C$_{30}$-alkyl (ether), —C(O)—C$_1$-C$_{30}$-alkyl (aldehyde), (=O), —S—C$_1$-C$_{30}$-alkylthioether, —C(O)NHOH (hydroxamate) or —N(R$_1$)—C(O)OH (carbamate).

As used herein, the term "$C_1$-$C_{30}$-alkyl" refers to linear or branched hydrocarbons having 1 to 30 carbon atoms. Non-limiting example of $C_1$-$C_{30}$ alkyl include, but are not limited to methyl, ethyl, propyl, isopropyl, n-butyl, isobutyl, tert-butyl, pentyl, in particular n-pentyl, isopentyl, tert-pentyl, n-hexyl, isohexyl, tert-hexyl, n-heptyl, isoheptyl, tert-heptyl, n-octyl, isooctyl, tert-octyl, nonyl, n-nonyl, isononyl, tert-nonyl, n-decyl, isodecyl, tert-decyl, undecyl, n-undecyl, isoundecyl, tert-undecyl, or dodecyl, n-dodecyl, isododecyl or tert-dodecyl.

As used herein, the term "$C_2$-$C_{30}$-alkenyl" refers to linear or branched hydrocarbons having 2 to 30 carbon atoms and at least one C=C double bond. Examples of alkenyl which are particularly preferred according to the invention are ethenyl (vinyl), propenyl, in particular n-propenyl, isopropenyl, butenyl, n-butenyl, isobutenyl, tert-butenyl, pentenyl, in particular n-pentenyl, isopentenyl, tert-pentenyl, hexenyl, in particular n-hexenyl, isohexenyl, tert-hexenyl, heptenyl, in particular n-heptenyl, isoheptenyl, tert-heptenyl, octenyl, in particular n-octenyl, isooctenyl, tert-octenyl, nonenyl, in particular n-nonenyl, isononenyl, tert-nonenyl, decenyl, in particular n-decenyl, isodecenyl, tert-decenyl, undecenyl, in particular n-undecenyl, isoundecenyl, tert-undecenyl, or dodecenyl, in particular n-dodecenyl, isododecenyl or tert-dodecenyl.

As used herein, the term "$C_1$-$C_{30}$-heteroalkyl" refers to linear or branched hydrocarbons having 1 to 30 carbon atoms and at least one heteroatom selected form the group consisting of N, O, P and S. The at least one heteroatom may be either the point of attachment, such as in -Het-CH$_2$—, part of the chain, such as in —CH$_2$-Het-CH$_2$—, or the heteroatom may be terminal, such as in —CH$_2$-Het, wherein "Het" denotes the heteroatom. In case the heteroatom is terminal, the free valences may be occupied by hydrogen or a $C_1$-$C_{30}$-alkyl group.

As used herein, the term "$C_6$-$C_{30}$-aryl" refers to aromatic carbocyclic rings of 6 to 30 ring members, including both mono, bi-, and tri-cyclic ring systems. Non-limiting examples of $C_6$-$C_{30}$-aryl include -indenyl, -phenyl, -naphthyl-, acenaphthyl-antranyl, -phenanthryl and the like.

As used herein, the term "$C_6$-$C_{30}$-cycloalkyl" refers to mono-, bi- or tricyclic saturated hydrocarbons having from 6 to 30 carbon atoms. Representative $C_6$-$C_{30}$-cycloalkyl include cyclohexyl, cecloheptyl, cyclooctyl, cyclononyl, cyclodecyl, cycloundecyl and cyclododecyl.

As used herein, the term "$C_6$-$C_{30}$ heterocycloalkyl" refers to a 6 to 30-membered mono-, bi- or tricyclic heterocyclic ring which is either saturated, unsaturated, non-aromatic or aromatic. The heteroatom in the heterocycloalkyl may be selected from O, S, P and N, wherein the nitrogen may be quartarnized and the S may also be present in form of $S(O^-)$ or $S(O)_2$.

As used herein, the term "$C_6$-$C_{30}$-aralkyl" refers to aromatic mono-, bi or tricyclic rings that are substituted with 1, 2, 3, 4 or 5 alkyl groups. Examples of $C_6$-$C_{30}$-arylalkyl include tolyl, xylyl, propylbenzyl and hexylbenzyl.

As used herein, the term "collector" refers to a compound that selectively forms a hydrophobic layer on a given valuable matter containing material such as a mineral surface. Collectors are typically known for their use in flotation processes. A collector may be an ionizing collector, such as a cationic collector or an anionic collector; or a non-ionizing collector. The term "ionizing" as used in "ionizing collector" refers to a collector that dissociates in water in at least two groups, such as in a cation and an anion. The term "anionic collectors" refers to collectors wherein the anionic part forms the hydrophobic layer on a given mineral. The term "cationic collector" refers to a collector wherein the cationic part forms a hydrophobic layer on a given mineral surface. The term "non-ionizing collector" refers to collectors which are usually liquid, non-polar hydrocarbons that do not dissociate in water.

Examples of anionic collectors include, but are not limited to, oxyhydryl collectors such as carboxylates, alkyl sulfates, sulfonates, hydroxamates, sulfosuccinates and sulfosuccinamates, phosphonic acid derivatives, phosphoric acid ester, sulfhydryls, sulfur and nitrogen derivatives of carbonic acids, preferably xanthates, dithiophosphinates, trithiocarbonates and substituted mercaptobenzothiozoles and dithiophosphates.

Examples of cationic collectors include, but are not limited to, compounds comprising at least one primary, secondary, tertiary or quaternary amine such as fatty amines or ether amines.

Examples of non-ionizing collectors include, but are not limited to, kerosene, transformer oils and synthetic hydrocarbon oils.

Further, collectors may also have a polymeric structure such as the polymers described in WO 2013/038192 A1.

Non-limiting examples of collectors are also found in the collector handbook of floating agents: chemistry, theory and practice, Srdjan M. Balutovic, February 2008, Elsevier.

As used herein, the term "rare earth metal" refers to one of a set of seventeen chemical elements in the periodic table, namely the fifteen lanthanides plus scandium and yttrium.

As used herein, the term "mineral" or "ore" refers to a naturally occurring substance that is solid inorganic and representable by a chemical formula, which is usually abiogenic and may have an ordered atomic structure. An ore mineral may carry a valuable matter. The ore mineral is different from a rock, which can be an aggregate of minerals and/or non-minerals. Examples of minerals include, but are not limited to, sulfides, oxides, halides, carbonates, sulfates, and phosphates of valuable metals.

FIGURES

FIG. 1 displays an exemplary column for step (C) of the process according to the present invention.

Figure 2:
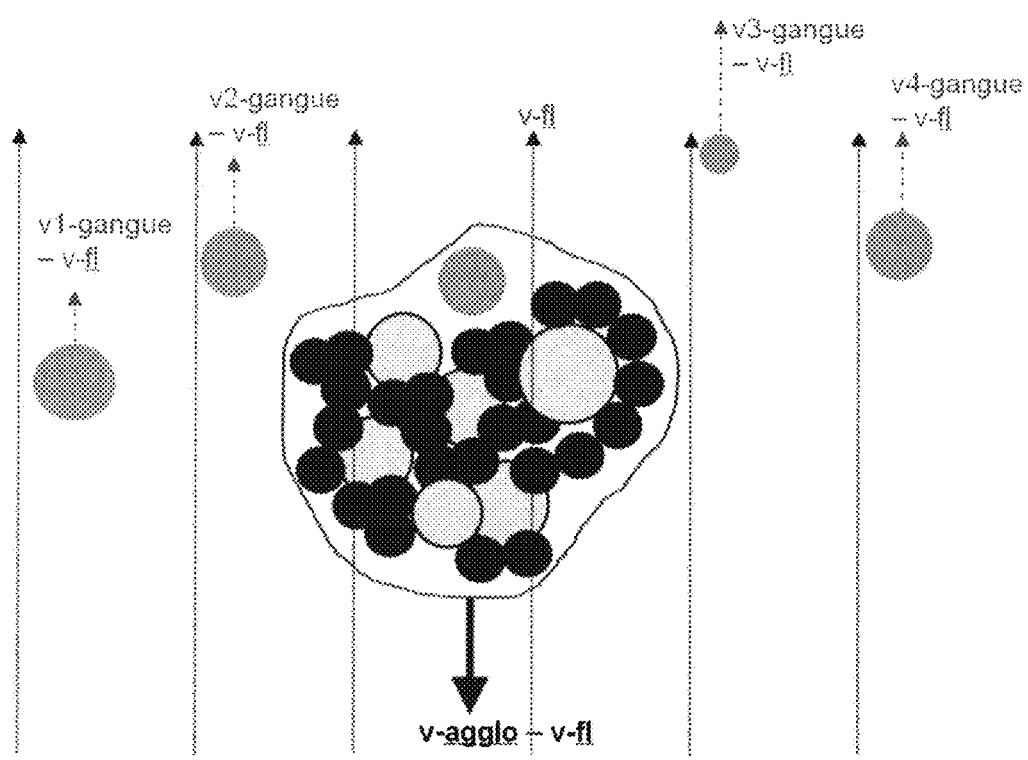
FIG. 2 shows a schematic explanation of separation of the magnetic agglomerates from the at least one second not agglomerated particles.

In FIG. 1, the numbers have the following meaning:
1 inlet, through which the dispersion comprising magnetic agglomerates and non-magnetic at least one second material is introduced
2 second inlet, through which a dispersion medium is introduced
3 first outlet, through which the denser and coarser magnetic agglomerates flow out in a dispersion with higher solid concentration
4 second outlet, through which the dispersion comprising the at least one second material (gangue) flows out
5 Main part of the column where the gravity induced separation of solid components is taking place In FIG. 2 it is explained schematically how the separation of the magnetic agglomerates (agglo) from the at least one second not agglomerated (gangue) particles. In equilibrium, simple force balance gives:

F-gray=F-buoy+F-drag

From this force balance between gravity (F-grav), buoyancy (F-buoy) and drag (F-drag) different relative velocities result as a function of mean particle size and density. For this reason separation can take place. Settling velocity in stagnant fluid can be calculated from the force balance to:

$$v_i = \frac{(\rho_i - \rho_{fl})}{\mu_{fl}} \frac{g}{18} d_i^2$$

"v" refers to velocity, "g" is the Earth's acceleration, "d" is the mean particle diameter, "ρ" is the density and "μ" the viscosity of a phase. Sub-indices "i" and "fl" refer to a solid component, preferably magnetic agglomerate or gangue and the dispersion medium, respectively.

From this relation it becomes clear why the magnetic agglomerates ideally flow in opposite direction to the flow velocity, as gravity overcomes buoyancy and drag due to their larger density and agglomerate size. If design is made properly, the one second non agglomerated gangue material flows upward in the same direction as the flow, since v-fl is chosen larger than the settling velocity of the majority of the gangue particles (v-gangue).

EXAMPLES

Two elutriation trials for the separation of magnetic agglomerates from non-magnetic gangue material are presented below. The carrier magnetic particles had in both cases a mean particle size (d80) of 7 microns. The particle sizes that are mentioned in the examples are acquired according to Malvern, wherein the Mastersizer measurement is based on the ISO 13320:2009 standard. Ultra sonic is applied to the samples during their preparation before measurement, and ultra sonic is applied to the samples during measurement. Both trials were conducted at comparable conditions in the same column with 350 mm in diameter.

Example 1 according to the present invention was carried out with a dispersion of magnetic agglomerates formed between the at least one magnetic particle and the at least one first material containing valuable displaying a size (d80) of 38 μm, the non-magnetic material had the same particle size distribution as the valuable non-magnetic material from which the agglomerates were formed. The particle size ratio between magnetic and non-magnetic material for Example 1 is 5.4. The grade of magnetic particles in the dispersion according to example 1 was 3% by weight, based on total solids present in the dispersion.

Comparative example 2 was done with a similar dispersion with the only difference being the particle size of the non-magnetic material (valuable and gangue) which was 150 μm. Particle size ratio for example 2 was 21.4. The grade of magnetic particles in the dispersion according to comparative example 2 was 3% by weight, based on all solids present in the dispersion.

The recovery of magnetic material of example 1 was 99.55%, corresponding to a Cu-Recovery of 98.17%, whereas according to example 2 a recovery of magnetic material of only 44.19%, corresponding to a Cu-Recovery of only 55.59%, could be obtained.

According to example 1 according to the present invention, the grade of magnetic particles could be increased by use of elutriation to 33.33% by weight, based on total solids present in the dispersion, whereas according to comparative example 2, the grade of magnetic particles is decreased to 1.41% by weight, based on total solids present in the dispersion.

Further, according to inventive example 1, the total mass flow rate of solids was also reduced compared to the feed flow rate confirming the option to reduce the tonnage for subsequent step (D). In total, comparative example 2 was not successful in separating the agglomerates from the gangue.

The invention claimed is:
1. A process for the separation of at least one first material from a mixture comprising the at least one first material and at least one second material, the process comprising the following steps:
(A) contacting of the mixture comprising the at least one first material and the at least one second material with at least one magnetic particle optionally in the presence of at least one dispersion medium, so that the at least one first material and the at least one magnetic particle agglomerate to obtain a mixture or dispersion comprising magnetic agglomerates of the at least one first material and the at least one magnetic particle, and the at least one second material,
(B) optionally adding at least one dispersion medium to the mixture or dispersion of step (A),
(C) separating at least part of the at least one second material due to its different settling velocity under gravitation compared to the magnetic agglomerates of the at least one first material and at least one magnetic particle, from the dispersion of step (A) or (B), to obtain a dispersion comprising a lower amount of the at least one second material,
(D) separating the magnetic agglomerates from the dispersion of step (C) by applying a magnetic field;
wherein the at least one first material is a hydrophobic metal compound selected from the group consisting of sulfidic ores, oxidic and/or carbonate comprising ores, noble metals in elemental form, compounds comprising noble metals, and mixtures thereof;

wherein the at least one second material is a hydrophilic metal compound selected from the group consisting of oxidic metal compounds, hydroxidic metal compounds, and mixtures thereof;

wherein the ratio of particle size of the at least one first material and the at least one magnetic particle is from about 1:1 to about 7:1;

wherein step (C) is conducted by flowing the dispersion of step (A) or (B) upward through a vertically arranged column with an upper end and a lower end, and flowing a stream of the at least one dispersion medium in the opposite direction as the dispersion of steps (A) or (B); wherein the at least one second material is collected at the top of the column and the magnetic agglomerates are collected at the bottom of the column.

2. The process according to claim 1, wherein the at least one hydrophobic metal compound is selected from the group consisting of covellite (CuS), chalcopyrite ($CuFeS_2$), bornite ($CusFeS_4$), chalcocite ($Cu_2S$), pentlandite ($Fe, Ni)_9S_8$, FeS, $FeS_2$, PbS, ZnS and mixtures thereof.

3. The process according to claim 1, wherein the at least one hydrophobic metal compound is selected from the group consisting of azurite [$Cu_3(CO_3)_2(OH)_2$] or malachite [$Cu_2[(OH)_2|CO_3]$], rare earth metal comprising ores, and mixtures of any of the foregoing.

4. The process according to claim 1, wherein the hydrophobic metal compound has been hydrophobized by the treatment with at least one surface-modifying agent.

5. The process according to claim 1, wherein the at least one dispersion medium is water.

6. The process according to claim 1, wherein the at least one first material and the at least one magnetic particle agglomerate as a result of hydrophobic interactions, different surface charges and/or compounds in the mixture that selectively couple the at least one first material and the at least one magnetic particle.

7. The process according to claim 1, wherein at least 50% by weight of the whole amount of the at least one second material being present in the mixture that is originally introduced into the process is separated in step (C).

8. The process according to claim 1, wherein the process further comprises a step (E) that is conducted after step (D):
(E) dissociating the agglomerate obtained in step (D) in order to obtain the at least one first material and the at least one magnetic particle separately.

9. The process according to claim 1, wherein the at least one hydrophobic metal compound is selected from the group consisting of azurite [$Cu_3(CO_3)_2(OH)_2$] or malachite [$Cu_2[(OH)_2|CO_3]$], bastnaesite (Y, Ce, La)$CO_3F$, monazite (RE)$PO_4$ (RE=rare earth metal); chrysocolla $(Cu,Al)_2H_2Si_2O_5(OH)_4$ and hydrates thereof, and mixtures of any of the foregoing.

10. The process according to claim 1, wherein the ratio of particle size of the at least one first material to the at least one magnetic particle is from about 2:1 to about 7:1.

11. The process according to claim 1, wherein the ratio of particle size of the at least one first material to the at least one magnetic particle is from about 5:1 to about 7:1.

12. The process according to claim 4, wherein the at least one surface-modifying agent is a collector, and wherein the collector is a non-ionizing collector selected from liquid, non-polar hydrocarbons that do not dissociate in water.

* * * * *